US007397791B2

(12) United States Patent
Binder

(10) Patent No.: US 7,397,791 B2
(45) Date of Patent: Jul. 8, 2008

(54) TELEPHONE COMMUNICATION SYSTEM OVER A SINGLE TELEPHONE LINE

(75) Inventor: Yehuda Binder, Hod Hasharon (IL)

(73) Assignee: SERCONET, Ltd., Ra'anana (IL)

( * ) Notice: Subject to any disclaimer, the term of this patent is extended or adjusted under 35 U.S.C. 154(b) by 682 days.

(21) Appl. No.: 11/026,014

(22) Filed: Jan. 3, 2005

(65) Prior Publication Data
US 2005/0117603 A1 Jun. 2, 2005

Related U.S. Application Data

(63) Continuation of application No. 09/594,765, filed on Jun. 16, 2000, now Pat. No. 7,106,721.

(30) Foreign Application Priority Data

Apr. 18, 2000 (IL) .................................... 135744

(51) Int. Cl.
*H04L 12/66* (2006.01)
*H04J 3/16* (2006.01)
(52) U.S. Cl. ........................ 370/352; 370/419; 370/494; 379/93.07
(58) Field of Classification Search ......... 370/352–356, 370/389, 392, 419–430, 463, 493, 494, 495, 370/350, 357, 360, 488, 466, 497, 535–538, 370/542; 379/93.01, 93.07
See application file for complete search history.

(56) References Cited

U.S. PATENT DOCUMENTS

| | | | |
|---|---|---|---|
| 2,264,395 A | 12/1941 | Mitchell | |
| 2,264,396 A | 12/1941 | Moore | |
| 2,510,273 A | 6/1950 | Barstow et al. | |
| 2,516,211 A | 7/1950 | Hochgraf | |
| 2,568,342 A | 9/1951 | Koehler et al. | |
| 3,280,259 A | 10/1966 | Cotter | |
| 3,369,078 A | 2/1968 | Stradley | |
| 3,406,344 A | 10/1968 | Hopper | |

(Continued)

FOREIGN PATENT DOCUMENTS

EP 0241152 A2 10/1987

(Continued)

OTHER PUBLICATIONS

Grayson Evans, The CEBus Standard User's Guide, 1st edition, May 1996, 317 pages.
Mark Hachman, Compaq to Ride the CEBus, EBN, Jan. 22, 1996, 1 page.
Home Automation Buses: Protocols Really Hit Home, EDN, Apr. 13, 1995, 9 pages.

(Continued)

*Primary Examiner*—Afsar Qureshi
(74) *Attorney, Agent, or Firm*—Browdy and Neimark

(57) ABSTRACT

An improved telephone system over a single telephone line within a residence or other building is disclosed, supporting exchange features and enabling easy expansion for multiple external lines. The existing telephone wiring is used as the medium for a local data communication network carrying multiple voice channels. In each outlet, one or more voice channels are converted into a standard telephone-line interface. Life-line functionality is facilitated by using the lower band of the spectrum isolated from the data communication network, and a dedicated connector in the outlet provides access to this band. External telephone feeders are converted to digital form for interfacing to the in-home data communication network.

20 Claims, 13 Drawing Sheets

U.S. PATENT DOCUMENTS

| | | |
|---|---|---|
| 3,511,936 A | 5/1970 | Saltzberg |
| 3,529,088 A | 9/1970 | Hauer |
| 3,651,471 A | 3/1972 | Hasselwood et al. |
| 3,723,653 A | 3/1973 | Tatsuzawa |
| 3,739,226 A | 6/1973 | Seiter et al. |
| 3,805,265 A | 4/1974 | Lester |
| 3,872,253 A | 3/1975 | Jurschak |
| 3,872,319 A | 3/1975 | Platzer Jr. |
| 3,873,771 A | 3/1975 | Kleinerman et al. |
| 3,875,339 A | 4/1975 | Gruen et al. |
| 3,876,984 A | 4/1975 | Chertok |
| 3,937,889 A | 2/1976 | Bell, III et al. |
| 3,949,172 A | 4/1976 | Brown et al. |
| 3,992,589 A | 11/1976 | Kuegler |
| 4,008,369 A | 2/1977 | Theurer et al. |
| 4,035,838 A | 7/1977 | Bassani et al. |
| 4,054,910 A | 10/1977 | Chou et al. |
| 4,058,678 A | 11/1977 | Dunn et al. |
| 4,171,467 A | 10/1979 | Evenchik |
| 4,206,320 A | 6/1980 | Keasler et al. |
| 4,262,171 A | 4/1981 | Schneider et al. |
| 4,302,629 A | 11/1981 | Foulkes et al. |
| 4,328,579 A | 5/1982 | Hashimoto et al. |
| 4,332,980 A | 6/1982 | Reynolds et al. |
| 4,339,816 A | 7/1982 | Reed |
| 4,367,548 A | 1/1983 | Cotten, Jr. et al. |
| 4,378,470 A | 3/1983 | Murto et al. |
| 4,380,009 A | 4/1983 | Long et al. |
| 4,387,271 A | 6/1983 | Artom |
| 4,388,489 A | 6/1983 | Wigan et al. |
| 4,393,508 A | 7/1983 | Boudault |
| 4,425,642 A | 1/1984 | Moses et al. |
| 4,433,212 A | 2/1984 | Moses et al. |
| 4,442,320 A | 4/1984 | James et al. |
| 4,442,540 A | 4/1984 | Allen |
| 4,443,662 A | 4/1984 | Nakhla |
| 4,444,999 A | 4/1984 | Sparrevohn |
| 4,449,218 A | 5/1984 | Strehl |
| 4,456,985 A | 6/1984 | Carsten et al. |
| 4,456,986 A | 6/1984 | Carsten et al. |
| 4,459,434 A | 7/1984 | Benning et al. |
| 4,475,193 A | 10/1984 | Brown |
| 4,479,033 A | 10/1984 | Brown et al. |
| 4,484,185 A | 11/1984 | Graves |
| 4,485,400 A | 11/1984 | Lemelson et al. |
| 4,493,948 A | 1/1985 | Sues et al. |
| 4,500,751 A | 2/1985 | Darland et al. |
| 4,506,387 A | 3/1985 | Walter |
| 4,514,594 A | 4/1985 | Brown et al. |
| 4,521,881 A | 6/1985 | Stapleford et al. |
| 4,523,307 A | 6/1985 | Brown et al. |
| 4,528,422 A | 7/1985 | Cupani |
| 4,546,212 A | 10/1985 | Crowder, Sr. |
| 4,561,020 A | 12/1985 | Matsuda |
| 4,564,940 A | 1/1986 | Yahata |
| 4,577,311 A | 3/1986 | Duquesne et al. |
| 4,577,314 A | 3/1986 | Chu et al. |
| 4,578,535 A | 3/1986 | Simmons |
| 4,578,540 A | 3/1986 | Borg et al. |
| 4,580,291 A | 4/1986 | Ab der Halden |
| 4,584,690 A | 4/1986 | Cafiero et al. |
| 4,597,077 A | 6/1986 | Nelson et al. |
| 4,604,741 A | 8/1986 | Barsellotti |
| 4,608,686 A | 8/1986 | Barsellotti |
| 4,631,367 A | 12/1986 | Coviello et al. |
| 4,636,914 A | 1/1987 | Belli |
| 4,644,526 A | 2/1987 | Wu |
| 4,646,289 A | 2/1987 | Tsiakas et al. |
| 4,646,296 A | 2/1987 | Bartholet et al. |
| 4,647,725 A | 3/1987 | Dellinger et al. |
| 4,649,551 A | 3/1987 | Sander et al. |
| 4,651,022 A | 3/1987 | Cowley |
| 4,656,655 A | 4/1987 | Hashimoto |
| 4,665,516 A | 5/1987 | Middleton et al. |
| 4,670,870 A | 6/1987 | Hewinson et al. |
| 4,670,874 A | 6/1987 | Sato et al. |
| 4,672,602 A | 6/1987 | Hargrave et al. |
| 4,672,605 A | 6/1987 | Hustig et al. |
| 4,674,085 A | 6/1987 | Aranguren et al. |
| 4,679,227 A | 7/1987 | Hughes-Hartogs |
| 4,701,945 A | 10/1987 | Pedigo |
| 4,703,499 A | 10/1987 | Fossas et al. |
| 4,709,412 A | 11/1987 | Seymour et al. |
| 4,731,821 A | 3/1988 | Jackson, III |
| 4,734,932 A | 3/1988 | Lott |
| 4,750,094 A | 6/1988 | Krasik |
| 4,754,326 A | 6/1988 | Kram et al. |
| 4,755,792 A | 7/1988 | Pezzolo et al. |
| 4,757,495 A | 7/1988 | Decker et al. |
| 4,757,497 A | 7/1988 | Beierle et al. |
| 4,764,922 A | 8/1988 | Dieter et al. |
| 4,766,402 A | 8/1988 | Crane |
| 4,768,110 A | 8/1988 | Dunlap et al. |
| 4,768,206 A | 8/1988 | Van Gerwen |
| 4,769,837 A | 9/1988 | McCormick et al. |
| 4,776,006 A | 10/1988 | Comerford et al. |
| 4,780,757 A | 10/1988 | Bryer et al. |
| 4,780,758 A | 10/1988 | Lin et al. |
| 4,785,448 A | 11/1988 | Reichert et al. |
| 4,785,472 A | 11/1988 | Shapiro |
| 4,787,082 A | 11/1988 | Delaney et al. |
| 4,789,895 A | 12/1988 | Mustafa et al. |
| 4,789,994 A | 12/1988 | Randall et al. |
| 4,799,213 A | 1/1989 | Fitzgerald |
| 4,807,225 A | 2/1989 | Fitch |
| 4,814,941 A | 3/1989 | Speet et al. |
| 4,821,319 A | 4/1989 | Middleton et al. |
| 4,825,435 A | 4/1989 | Amundsen et al. |
| 4,829,570 A | 5/1989 | Schotz |
| 4,837,799 A | 6/1989 | Prohs et al. |
| 4,839,743 A | 6/1989 | Best et al. |
| 4,843,606 A | 6/1989 | Bux et al. |
| 4,847,903 A | 7/1989 | Schotz |
| 4,849,811 A | 7/1989 | Kleinerman |
| 4,866,704 A | 9/1989 | Bergman |
| 4,882,747 A | 11/1989 | Williams |
| 4,885,747 A | 12/1989 | Foglia |
| 4,885,766 A | 12/1989 | Yasuoka et al. |
| 4,888,795 A | 12/1989 | Ando et al. |
| 4,890,316 A | 12/1989 | Walsh et al. |
| 4,893,326 A | 1/1990 | Duran et al. |
| 4,901,342 A | 2/1990 | Jones |
| 4,918,688 A | 4/1990 | Krause et al. |
| 4,924,349 A | 5/1990 | Buehler et al. |
| 4,924,492 A | 5/1990 | Gitlin et al. |
| 4,932,022 A | 6/1990 | Keeney et al. |
| 4,932,047 A | 6/1990 | Emmons et al. |
| 4,945,404 A | 7/1990 | Miller |
| 4,947,483 A | 8/1990 | Dirr |
| 4,949,187 A | 8/1990 | Cohen |
| 4,953,160 A | 8/1990 | Gupta |
| 4,954,886 A | 9/1990 | Elberbaum |
| 4,955,048 A | 9/1990 | Iwamura et al. |
| 4,969,136 A | 11/1990 | Chamberlain et al. |
| 4,975,896 A | 12/1990 | D'Agosto, III et al. |
| 4,975,906 A | 12/1990 | Takiyasu et al. |
| 4,979,028 A | 12/1990 | Minematsu et al. |
| 4,985,892 A | 1/1991 | Camarata |
| 4,989,081 A | 1/1991 | Miyagawa et al. |
| 4,996,709 A | 2/1991 | Heep et al. |
| 5,010,399 A | 4/1991 | Goodman et al. |
| 5,022,069 A | 6/1991 | Chen |
| 5,023,868 A | 6/1991 | Davidson et al. |
| 5,027,426 A | 6/1991 | Chiocca, Jr. |

| | | | | | | |
|---|---|---|---|---|---|---|
| 5,036,513 A | 7/1991 | Greenblatt | | 5,805,591 A | 9/1998 | Naboulsi et al. |
| 5,051,822 A | 9/1991 | Rhoades | | 5,812,786 A | 9/1998 | Seaholtz et al. |
| 5,070,522 A | 12/1991 | Nilssen | | 5,822,678 A | 10/1998 | Evanyk |
| 5,089,886 A | 2/1992 | Grandmougin | | 5,826,196 A | 10/1998 | Cuthrell |
| 5,090,052 A | 2/1992 | Nakajima et al. | | 5,833,350 A | 11/1998 | Moreland |
| 5,095,497 A | 3/1992 | Aman et al. | | 5,838,777 A | 11/1998 | Chang et al. |
| 5,114,365 A | 5/1992 | Thompson et al. | | 5,841,360 A | 11/1998 | Binder |
| 5,192,231 A | 3/1993 | Dolin, Jr. | | 5,841,840 A | 11/1998 | Smith et al. |
| 5,247,347 A | 9/1993 | Litteral et al. | | 5,841,841 A | 11/1998 | Dodds et al. |
| 5,257,006 A | 10/1993 | Graham et al. | | 5,842,111 A | 11/1998 | Byers |
| 5,283,637 A | 2/1994 | Goolcharan | | 5,848,054 A | 12/1998 | Mosebrook et al. |
| 5,319,634 A | 6/1994 | Bartholomew et al. | | 5,848,150 A | 12/1998 | Bingel |
| 5,341,415 A | 8/1994 | Baran | | 5,878,047 A | 3/1999 | Ganek et al. |
| 5,353,334 A | 10/1994 | O'Sullivan | | 5,889,856 A | 3/1999 | O'Toole et al. |
| 5,363,432 A | 11/1994 | Martin et al. | | 5,892,764 A | 4/1999 | Riemann et al. |
| 5,379,005 A | 1/1995 | Aden et al. | | 5,895,985 A | 4/1999 | Fischer |
| 5,402,902 A | 4/1995 | Bouley | | 5,896,443 A | 4/1999 | Dichter |
| 5,408,260 A | 4/1995 | Arnon | | 5,896,556 A | 4/1999 | Moreland et al. |
| 5,410,343 A | 4/1995 | Coddington et al. | | 5,898,761 A * | 4/1999 | McHale et al. ............ 379/93.01 |
| 5,440,335 A | 8/1995 | Beveridge | | 5,903,643 A | 5/1999 | Bruhnke |
| 5,448,635 A | 9/1995 | Biehl et al. | | 5,905,786 A | 5/1999 | Hoopes |
| 5,452,289 A | 9/1995 | Sharma et al. | | 5,911,119 A | 6/1999 | Bartholomew et al. |
| 5,463,616 A | 10/1995 | Kruse et al. | | 5,912,895 A | 6/1999 | Terry et al. |
| 5,471,190 A | 11/1995 | Zimmermann | | 5,930,340 A | 7/1999 | Bell |
| 5,473,517 A | 12/1995 | Blackman | | 5,937,055 A | 8/1999 | Kaplan |
| 5,473,613 A | 12/1995 | Bliven | | 5,940,479 A | 8/1999 | Guy et al. |
| 5,500,794 A | 3/1996 | Fujita et al. | | 5,943,404 A | 8/1999 | Sansom et al. |
| 5,530,737 A | 6/1996 | Bartholomew et al. | | 5,949,476 A | 9/1999 | Pocock et al. |
| 5,533,101 A | 7/1996 | Miyagawa | | 5,960,066 A | 9/1999 | Hartmann et al. |
| 5,539,821 A | 7/1996 | Blonder | | 5,963,539 A | 10/1999 | Webber, Jr. et al. |
| 5,548,592 A | 8/1996 | Komarek et al. | | 5,963,595 A | 10/1999 | Graham et al. |
| 5,550,836 A | 8/1996 | Albrecht et al. | | 5,968,118 A | 10/1999 | Sutton, Jr. |
| 5,553,063 A | 9/1996 | Dickson | | 5,970,127 A | 10/1999 | Smith et al. |
| 5,563,782 A | 10/1996 | Chen et al. | | 5,982,784 A | 11/1999 | Bell |
| 5,566,233 A | 10/1996 | Liu | | 5,982,854 A | 11/1999 | Ehreth |
| 5,569,209 A | 10/1996 | Roitman | | 5,995,598 A | 11/1999 | Berstis |
| 5,574,256 A | 11/1996 | Cottone | | 6,002,722 A | 12/1999 | Wu |
| 5,581,555 A | 12/1996 | Dubberly et al. | | 6,005,873 A * | 12/1999 | Amit .......................... 370/494 |
| 5,587,692 A | 12/1996 | Graham et al. | | 6,010,228 A | 1/2000 | Blackman et al. |
| 5,592,540 A | 1/1997 | Beveridge | | 6,026,150 A | 2/2000 | Frank et al. |
| 5,596,631 A | 1/1997 | Chen | | 6,029,047 A | 2/2000 | Ishida et al. |
| 5,604,737 A | 2/1997 | Iwami et al. | | 6,038,300 A | 3/2000 | Hartmann et al. |
| 5,604,791 A | 2/1997 | Lee | | 6,038,425 A | 3/2000 | Jeffrey |
| 5,610,916 A | 3/1997 | Kostreski et al. | | 6,046,995 A | 4/2000 | Turnbull et al. |
| 5,610,922 A | 3/1997 | Balatoni | | 6,047,055 A | 4/2000 | Carkner et al. |
| 5,619,252 A | 4/1997 | Nakano | | 6,052,380 A | 4/2000 | Bell |
| 5,621,455 A | 4/1997 | Rogers et al. | | 6,055,435 A | 4/2000 | Smith et al. |
| 5,623,537 A | 4/1997 | Ensor et al. | | 6,061,261 A | 5/2000 | Chen et al. |
| 5,625,863 A | 4/1997 | Abraham | | 6,061,357 A | 5/2000 | Olshansky et al. |
| 5,627,827 A | 5/1997 | Dale et al. | | 6,061,392 A | 5/2000 | Bremer et al. |
| 5,627,833 A | 5/1997 | Bliven | | 6,069,899 A | 5/2000 | Foley |
| 5,646,983 A | 7/1997 | Suffern et al. | | 6,087,860 A | 7/2000 | Liu et al. |
| 5,675,375 A | 10/1997 | Riffee | | 6,088,368 A | 7/2000 | Rubinstain et al. |
| 5,682,386 A | 10/1997 | Arimilli et al. | | 6,094,441 A | 7/2000 | Jung et al. |
| 5,696,790 A | 12/1997 | Graham et al. | | 6,097,801 A | 8/2000 | Williams et al. |
| 5,705,974 A | 1/1998 | Patel et al. | | 6,101,341 A | 8/2000 | Manabe |
| 5,708,701 A | 1/1998 | Houvig et al. | | 6,107,912 A | 8/2000 | Bullock et al. |
| 5,708,705 A | 1/1998 | Yamashita et al. | | 6,108,331 A | 8/2000 | Thompson |
| 5,712,614 A | 1/1998 | Patel et al. | | 6,115,755 A | 9/2000 | Krishan |
| 5,729,824 A | 3/1998 | O'Neill et al. | | 6,120,262 A | 9/2000 | McDonough et al. |
| 5,736,965 A | 4/1998 | Mosebrook et al. | | 6,123,577 A | 9/2000 | Contois et al. |
| 5,742,596 A | 4/1998 | Baratz et al. | | 6,128,471 A | 10/2000 | Quelch et al. |
| 5,747,995 A * | 5/1998 | Spies ...................... 324/207.2 | | 6,130,893 A | 10/2000 | Whittaker et al. |
| 5,757,803 A | 5/1998 | Russell et al. | | 6,134,235 A | 10/2000 | Goldman et al. |
| 5,757,936 A | 5/1998 | Lee | | 6,134,308 A | 10/2000 | Fallon et al. |
| 5,764,743 A | 6/1998 | Goedken et al. | | 6,137,865 A | 10/2000 | Ripy et al. |
| 5,771,232 A | 6/1998 | Sinibaldi et al. | | 6,141,330 A | 10/2000 | Akers |
| 5,774,526 A | 6/1998 | Propp et al. | | 6,141,356 A | 10/2000 | Gorman |
| 5,778,303 A | 7/1998 | Shinozaki et al. | | 6,144,399 A | 11/2000 | Manchester et al. |
| 5,781,622 A | 7/1998 | Ben-Zion | | 6,151,333 A | 11/2000 | Arimilli et al. |
| 5,787,115 A | 7/1998 | Turnball et al. | | 6,154,465 A | 11/2000 | Pickett |
| 5,801,635 A | 9/1998 | Price | | 6,160,880 A | 12/2000 | Allen |
| 5,802,283 A | 9/1998 | Grady et al. | | 6,167,043 A | 12/2000 | Frantz |

| | | |
|---|---|---|
| 6,169,795 B1 | 1/2001 | Dunn et al. |
| 6,188,557 B1 | 2/2001 | Chaudhry |
| 6,192,399 B1 | 2/2001 | Goodman |
| 6,202,211 B1 | 3/2001 | Williams, Jr. |
| 6,207,895 B1 | 3/2001 | Engel |
| 6,208,637 B1 | 3/2001 | Eames |
| 6,212,204 B1 | 4/2001 | Depue |
| 6,212,227 B1 | 4/2001 | Ko et al. |
| 6,215,789 B1 | 4/2001 | Keenan |
| 6,216,160 B1 | 4/2001 | Dichter |
| 6,222,124 B1 | 4/2001 | Pritchard et al. |
| 6,222,853 B1 | 4/2001 | Marttinen et al. |
| 6,236,653 B1 | 5/2001 | Dalton et al. |
| 6,240,166 B1 | 5/2001 | Collin et al. |
| 6,243,571 B1 | 6/2001 | Bullock et al. |
| 6,252,754 B1 | 6/2001 | Chaudhry |
| 6,259,775 B1 | 7/2001 | Alpert et al. |
| 6,282,075 B1 | 8/2001 | Chaudhry |
| 6,282,238 B1 | 8/2001 | Landry |
| 6,282,277 B1 | 8/2001 | DeBalko |
| 6,292,467 B1 | 9/2001 | Keller |
| 6,292,517 B1 | 9/2001 | Jeffress et al. |
| 6,297,450 B1 | 10/2001 | Yu |
| 6,310,894 B1 | 10/2001 | Counterman |
| 6,317,884 B1 | 11/2001 | Eames et al. |
| 6,320,900 B1 | 11/2001 | Liu |
| 6,324,167 B1 | 11/2001 | Starr |
| 6,324,268 B1 | 11/2001 | Balachandran et al. |
| 6,347,075 B1 | 2/2002 | Barzegar et al. |
| 6,349,133 B1 | 2/2002 | Matthews et al. |
| 6,362,987 B1 | 3/2002 | Yurek et al. |
| 6,364,535 B1 | 4/2002 | Coffey |
| 6,370,149 B1 | 4/2002 | Gorman et al. |
| 6,380,852 B1 | 4/2002 | Hartman et al. |
| 6,389,125 B1 | 5/2002 | Ubowski |
| 6,393,050 B1 | 5/2002 | Liu |
| 6,396,393 B2 | 5/2002 | Yuasa |
| 6,404,773 B1 | 6/2002 | Williams et al. |
| 6,414,952 B2 | 7/2002 | Foley |
| 6,420,964 B1 | 7/2002 | Nishikawa et al. |
| 6,424,661 B1 | 7/2002 | Bentley |
| 6,427,237 B1 | 7/2002 | Aranguren et al. |
| 6,430,199 B1 | 8/2002 | Kerpez |
| 6,433,672 B1 | 8/2002 | Shirmard |
| 6,434,123 B1 | 8/2002 | Park |
| 6,441,723 B1 | 8/2002 | Mansfield, Jr. et al. |
| 6,448,899 B1 | 9/2002 | Thompson |
| 6,449,318 B1 | 9/2002 | Rumbaugh |
| 6,449,348 B1 | 9/2002 | Lamb et al. |
| 6,470,053 B1 | 10/2002 | Liu |
| 6,473,495 B1 | 10/2002 | Willer |
| 6,474,829 B2 | 11/2002 | Clodfelter |
| 6,480,510 B1 | 11/2002 | Binder |
| 6,481,013 B1 | 11/2002 | Dinwiddie et al. |
| 6,483,902 B1 | 11/2002 | Stewart et al. |
| 6,492,897 B1 | 12/2002 | Mowery, Jr. |
| 6,493,325 B1 | 12/2002 | Hjalmtysson et al. |
| 6,493,875 B1 | 12/2002 | Eames et al. |
| 6,507,647 B1 | 1/2003 | Mandalia |
| 6,518,724 B2 | 2/2003 | Janik |
| 6,519,250 B1 | 2/2003 | Fan |
| 6,522,662 B1 | 2/2003 | Liu |
| 6,522,728 B1 | 2/2003 | Willer |
| 6,522,730 B1 | 2/2003 | Timm et al. |
| 6,522,731 B2 | 2/2003 | Matsumoto |
| 6,526,581 B1 | 2/2003 | Edson |
| 6,532,279 B1 | 3/2003 | Goodman |
| 6,532,280 B1 | 3/2003 | McDonald |
| 6,535,587 B1 | 3/2003 | Kobayashi |
| 6,539,011 B1 | 3/2003 | Keenan et al. |
| 6,539,081 B2 | 3/2003 | Zakrzewski et al. |
| 6,543,940 B2 | 4/2003 | Chu |
| 6,549,616 B1 | 4/2003 | Binder |
| 6,556,564 B2 | 4/2003 | Rogers |
| 6,556,581 B1 | 4/2003 | He et al. |
| 6,560,319 B1 | 5/2003 | Binder |
| 6,563,816 B1 | 5/2003 | Nodoushani et al. |
| 6,567,981 B1 | 5/2003 | Jeffrey |
| 6,570,869 B1 | 5/2003 | Shankar et al. |
| 6,570,890 B1 | 5/2003 | Keenan et al. |
| 6,572,384 B1 | 6/2003 | Marchevsky |
| 6,574,242 B1 | 6/2003 | Keenan et al. |
| 6,577,631 B1 | 6/2003 | Keenan et al. |
| 6,580,710 B1 | 6/2003 | Bowen et al. |
| 6,580,785 B2 | 6/2003 | Bremer et al. |
| 6,584,122 B1 | 6/2003 | Matthews et al. |
| 6,584,148 B1 | 6/2003 | Zitting et al. |
| 6,587,454 B1 | 7/2003 | Lamb |
| 6,587,473 B1 | 7/2003 | Terry et al. |
| 6,587,479 B1 | 7/2003 | Bianchi et al. |
| 6,601,097 B1 | 7/2003 | Cheston et al. |
| 6,603,808 B1 | 8/2003 | Anne et al. |
| 6,639,913 B1 * | 10/2003 | Frankel et al. ............... 370/356 |
| 6,653,932 B1 | 11/2003 | Beamish et al. |
| 6,657,994 B1 | 12/2003 | Rajakarunanayake |
| 6,678,321 B1 | 1/2004 | Graham et al. |
| 6,678,721 B1 | 1/2004 | Bell |
| 6,680,940 B1 * | 1/2004 | Lewin et al. ................. 370/389 |
| 6,686,832 B2 | 2/2004 | Abraham |
| 6,690,677 B1 | 2/2004 | Binder |
| 6,693,916 B1 | 2/2004 | Chaplik et al. |
| 6,697,358 B2 | 2/2004 | Bernstein |
| 6,700,970 B1 | 3/2004 | Aronson et al. |
| 6,701,406 B1 | 3/2004 | Chang et al. |
| 6,704,414 B2 | 3/2004 | Murakoshi |
| 6,710,553 B2 | 3/2004 | Logan |
| 6,711,138 B1 | 3/2004 | Pai et al. |
| 6,714,534 B1 * | 3/2004 | Gerszberg et al. ........... 370/352 |
| 6,721,365 B1 | 4/2004 | Yin et al. |
| 6,721,419 B1 | 4/2004 | Stell et al. |
| 6,721,790 B1 | 4/2004 | Chen |
| 6,731,627 B1 | 5/2004 | Gupta et al. |
| 6,732,315 B2 | 5/2004 | Yagil et al. |
| 6,732,368 B1 | 5/2004 | Michael et al. |
| 6,735,217 B1 | 5/2004 | Webber, Jr. et al. |
| 6,738,382 B1 | 5/2004 | West et al. |
| 6,738,470 B1 | 5/2004 | Aronovitz |
| 6,738,597 B1 | 5/2004 | Jeung et al. |
| 6,747,859 B2 | 6/2004 | Walbeck et al. |
| 6,747,995 B1 | 6/2004 | Brown et al. |
| 6,754,186 B1 | 6/2004 | Bullman |
| 6,759,946 B2 | 7/2004 | Sahinoglu et al. |
| 6,763,097 B1 | 7/2004 | Yitenberg |
| 6,765,149 B1 | 7/2004 | Ku |
| 6,771,750 B1 | 8/2004 | Nayler et al. |
| 6,771,773 B1 | 8/2004 | Hanrieder et al. |
| 6,771,774 B1 | 8/2004 | Phan et al. |
| 6,773,632 B1 | 8/2004 | Marshall et al. |
| 6,778,549 B1 | 8/2004 | Keller |
| 6,778,646 B1 | 8/2004 | Sun |
| 6,778,817 B1 | 8/2004 | Bullock et al. |
| 6,785,296 B1 | 8/2004 | Bell |
| 6,788,782 B1 | 9/2004 | Fotsch et al. |
| 6,792,323 B2 | 9/2004 | Krzyzanowski et al. |
| 6,798,767 B1 | 9/2004 | Alexande et al. |
| 6,819,760 B1 | 11/2004 | Nayler |
| 6,823,047 B1 | 11/2004 | Cruickshank |
| 6,831,975 B1 | 12/2004 | Easwaran et al. |
| 6,834,057 B1 | 12/2004 | Rabenko et al. |
| 6,836,546 B1 | 12/2004 | Willer |
| 6,838,997 B1 | 1/2005 | Davidson |
| 6,839,345 B2 | 1/2005 | Lu et al. |
| 6,842,459 B1 | 1/2005 | Binder |
| 6,854,895 B2 | 2/2005 | Coffey et al. |
| 6,856,799 B1 | 2/2005 | Ritter |
| 6,862,353 B2 | 3/2005 | Rabenko et al. |

| | | | | | | |
|---|---|---|---|---|---|---|
| 6,864,798 B2 | 3/2005 | Janik | | 2002/0038153 A1 | 3/2002 | Amodeo et al. |
| 6,865,193 B2 | 3/2005 | Terk | | 2002/0039388 A1 | 4/2002 | Smart et al. |
| 6,868,072 B1 | 3/2005 | Lin et al. | | 2002/0061012 A1 | 5/2002 | Thi et al. |
| 6,868,081 B1 | 3/2005 | Akram et al. | | 2002/0095662 A1 | 7/2002 | Ashlock et al. |
| 6,868,265 B2 | 3/2005 | Zodnik | | 2002/0104009 A1 | 8/2002 | Zodnik |
| 6,876,648 B1 | 4/2005 | Lee | | 2002/0128009 A1 | 9/2002 | Boch et al. |
| 6,880,020 B1 | 4/2005 | Rubinstein et al. | | 2002/0144159 A1 | 10/2002 | Wu et al. |
| 6,882,714 B2 | 4/2005 | Mansfield | | 2002/0166125 A1 | 11/2002 | Fulmet |
| 6,888,459 B2 | 5/2005 | Stilp | | 2002/0176567 A1 | 11/2002 | Chen et al. |
| 6,898,413 B2 | 5/2005 | Yip et al. | | 2002/0194383 A1 | 12/2002 | Cohen |
| 6,901,439 B1 | 5/2005 | Bonasia et al. | | 2002/0194605 A1 | 12/2002 | Cohen |
| 6,904,134 B2 | 6/2005 | Jeon et al. | | 2002/0198952 A1 | 12/2002 | Bell |
| 6,907,458 B2 | 6/2005 | Tomassetti et al. | | 2003/0016794 A1 | 1/2003 | Brothers |
| 6,909,725 B1 | 6/2005 | Chow | | 2003/0026247 A1 | 2/2003 | Bernstein |
| 6,912,209 B1 | 6/2005 | Thi et al. | | 2003/0039257 A1 | 2/2003 | Manis et al. |
| 6,922,407 B2 | 7/2005 | Wu | | 2003/0062990 A1 | 4/2003 | Schaeffer et al. |
| 6,925,089 B2 | 8/2005 | Chow et al. | | 2003/0067910 A1 | 4/2003 | Razazian et al. |
| 6,932,624 B1 | 8/2005 | Hoopes et al. | | 2003/0088706 A1 | 5/2003 | Chan et al. |
| 6,933,686 B1 | 8/2005 | Bishel | | 2003/0099228 A1 | 5/2003 | Alcock |
| 6,934,300 B2 | 8/2005 | Tomassetti et al. | | 2003/0112965 A1 | 6/2003 | McNamara et al. |
| 6,934,754 B2 | 8/2005 | West et al. | | 2003/0133476 A1 | 7/2003 | Stone et al. |
| 6,937,056 B2 | 8/2005 | Binder | | 2003/0151695 A1 | 8/2003 | Sahlin et al. |
| 6,940,956 B1 | 9/2005 | Leach | | 2003/0154273 A1 | 8/2003 | Caveney |
| 6,941,364 B2 | 9/2005 | Kim et al. | | 2003/0154276 A1 | 8/2003 | Caveney |
| 6,943,296 B2 | 9/2005 | Perrella et al. | | 2003/0204393 A1 | 10/2003 | Czerwiec et al. |
| 6,943,683 B2 | 9/2005 | Perret | | 2004/0006484 A1 | 1/2004 | Manis et al. |
| 6,946,988 B2 | 9/2005 | Edwards et al. | | 2004/0013098 A1 | 1/2004 | Tseng et al. |
| 6,947,736 B2 | 9/2005 | Shaver et al. | | 2004/0037317 A1 | 2/2004 | Zalitzky et al. |
| 6,955,560 B1 | 10/2005 | Biggs | | 2004/0073597 A1 | 4/2004 | Caveney et al. |
| 6,961,303 B1 | 11/2005 | Binder | | 2004/0083262 A1 | 4/2004 | Trantow |
| 6,963,559 B2 | 11/2005 | Elo | | 2004/0090984 A1 | 5/2004 | Sant-Hilaire et al. |
| 6,975,713 B1 | 12/2005 | Smith et al. | | 2004/0107299 A1 | 6/2004 | Lee et al. |
| 6,980,638 B1 | 12/2005 | Smith et al. | | 2004/0121648 A1 | 6/2004 | Voros |
| 6,981,892 B1 | 1/2006 | Kostelnik | | 2004/0136373 A1 | 7/2004 | Bareis |
| 6,985,714 B2 | 1/2006 | Akiyama et al. | | 2004/0136384 A1 | 7/2004 | Cho |
| 6,989,733 B2 | 1/2006 | Simonsen et al. | | 2004/0147232 A1 | 7/2004 | Zodnik |
| 6,993,289 B2 | 1/2006 | Janik | | 2004/0170262 A1 | 9/2004 | Ohno |
| 6,996,213 B1 | 2/2006 | De Jong | | 2004/0177167 A1 | 9/2004 | Iwamura et al. |
| 6,998,964 B2 | 2/2006 | Lomax, Jr. et al. | | 2004/0180573 A1 | 9/2004 | Chen |
| 7,002,898 B1 | 2/2006 | Lou | | 2004/0198236 A1 | 10/2004 | Paine et al. |
| 7,003,102 B2 | 2/2006 | Kiko | | 2004/0204017 A1 | 10/2004 | Eckel et al. |
| 7,009,946 B1 | 3/2006 | Kardach | | 2004/0204040 A1 | 10/2004 | Heijnen |
| 7,016,377 B1 | 3/2006 | Chun et al. | | 2004/0268160 A1 | 12/2004 | Atkinson et al. |
| 7,023,809 B1 | 4/2006 | Rubinstein et al. | | 2005/0015805 A1 | 1/2005 | Iwamura |
| 7,027,483 B2 | 4/2006 | Santhoff et al. | | 2005/0038875 A1 | 2/2005 | Park |
| 7,027,566 B2 | 4/2006 | Bossemeyer, Jr. et al. | | 2005/0047379 A1 | 3/2005 | Boyden et al. |
| 7,034,225 B2 | 4/2006 | Thompson et al. | | 2005/0053087 A1 | 3/2005 | Pulyk |
| 7,035,270 B2 | 4/2006 | Moore, Jr. et al. | | 2005/0073968 A1 | 4/2005 | Perlman |
| 7,046,618 B2 | 5/2006 | Santhoff et al. | | 2005/0076148 A1 | 4/2005 | Chan et al. |
| 7,054,303 B2 | 5/2006 | Miyazaki et al. | | 2005/0076149 A1 | 4/2005 | McKown et al. |
| 7,058,174 B2 | 6/2006 | Posthuma | | 2005/0086389 A1 | 4/2005 | Chang |
| 7,068,668 B2 | 6/2006 | Feuer | | 2005/0086694 A1 | 4/2005 | Hicks et al. |
| 7,082,141 B2 | 7/2006 | Sharma et al. | | 2005/0111491 A1 | 5/2005 | Caveny |
| 7,095,849 B2 | 8/2006 | Smith et al. | | 2005/0114325 A1 | 5/2005 | Liu et al. |
| 7,099,368 B2 | 8/2006 | Santhoff et al. | | 2005/0125083 A1 | 6/2005 | Kiko |
| 7,106,721 B1 | 9/2006 | Binder | | 2005/0136972 A1 | 6/2005 | Smith et al. |
| 7,113,574 B1 | 9/2006 | Haas et al. | | 2005/0141431 A1 | 6/2005 | Caveney et al. |
| 7,142,560 B2 | 11/2006 | Mansfield | | 2005/0150100 A1 | 7/2005 | Merdan et al. |
| 7,142,563 B1 | 11/2006 | Lin | | 2005/0152306 A1 | 7/2005 | Bonnassieux et al. |
| 7,142,934 B2 | 11/2006 | Janik | | 2005/0152323 A1 | 7/2005 | Bonnassieux et al. |
| 7,149,182 B1 | 12/2006 | Renucci et al. | | 2005/0152337 A1 | 7/2005 | Wurtzel et al. |
| 7,149,474 B1 | 12/2006 | Mikhak | | 2005/0177640 A1 | 8/2005 | Rubinstein et al. |
| 7,154,996 B2 | 12/2006 | Strauss | | 2005/0184915 A1 | 8/2005 | Nagel et al. |
| 7,162,013 B2 | 1/2007 | Gavette et al. | | 2005/0208825 A1 | 9/2005 | Chan |
| 7,171,506 B1 | 1/2007 | Iwamura | | 2005/0226200 A1 | 10/2005 | Askildsen et al. |
| 7,199,706 B2 | 4/2007 | Dawson et al. | | 2005/0228889 A1 | 10/2005 | Cohen et al. |
| 7,206,322 B1 | 4/2007 | Garg et al. | | 2005/0245127 A1 | 11/2005 | Nordin et al. |
| 7,206,417 B2 | 4/2007 | Nathan | | 2005/0272372 A1 | 12/2005 | Rodriguez |
| 7,209,719 B2 | 4/2007 | Liebenow | | 2005/0273790 A1 | 12/2005 | Kearney et al. |
| 2001/0030470 A1 | 10/2001 | Waugh et al. | | 2005/0281326 A1 | 12/2005 | Yu |
| 2001/0030950 A1 | 10/2001 | Liebenow | | 2006/0006817 A1 | 1/2006 | Chason et al. |
| 2002/0006137 A1 | 1/2002 | Rabenko et al. | | 2006/0047800 A1 | 3/2006 | Caveney et al. |
| 2002/0037004 A1 | 3/2002 | Bossemeyer et al. | | 2006/0072621 A1 | 4/2006 | Macaluso et al. |

| | | | |
|---|---|---|---|
| 2006/0079969 | A1 | 4/2006 | Seguin |
| 2006/0104291 | A1 | 5/2006 | Rodriguez et al. |
| 2006/0126617 | A1 | 6/2006 | Cregg et al. |
| 2006/0126862 | A1 | 6/2006 | Andrews et al. |
| 2006/0140178 | A1 | 6/2006 | Cheng et al. |
| 2006/0152344 | A1 | 7/2006 | Mowery et al. |
| 2006/0153169 | A1 | 7/2006 | Koifman et al. |
| 2006/0193310 | A1 | 8/2006 | Landry et al. |
| 2006/0193313 | A1 | 8/2006 | Landry et al. |
| 2006/0215680 | A1 | 9/2006 | Camagna |
| 2006/0238250 | A1 | 10/2006 | Camagna et al. |
| 2006/0251094 | A1 | 11/2006 | Van Vleck et al. |
| 2006/0251159 | A1 | 11/2006 | Huotari et al. |
| 2006/0251179 | A1 | 11/2006 | Ghoshal |
| 2006/0280197 | A1 | 12/2006 | Stone |
| 2006/0291493 | A1 | 12/2006 | Schley-May et al. |

FOREIGN PATENT DOCUMENTS

| | | | |
|---|---|---|---|
| EP | 1004222 | | 2/1999 |
| EP | 0961466 | A1 | 12/1999 |
| EP | 1343253 | A1 | 9/2003 |
| EP | 1605566 | A2 | 12/2003 |
| GB | 2368979 | A | 5/2002 |
| JP | 55132197 | A | 10/1980 |
| WO | WO 95/29576 | A3 | 11/1995 |
| WO | WO 97/19533 | A1 | 5/1997 |
| WO | WO 97/50193 | A1 | 12/1997 |
| WO | WO 99/12330 | A1 | 3/1999 |
| WO | WO 2001028215 | | 4/2001 |
| WO | WO 01/43238 | A1 | 6/2001 |
| WO | WO 02/091652 | A2 | 11/2002 |
| WO | WO 02/02019 | * | 12/2002 |
| WO | WO 02/102019 | A2 | 12/2002 |
| WO | WO 2005/032158 | A2 | 4/2005 |

OTHER PUBLICATIONS

Brian E. Markwalter, et al; CEBus Router Testing, IEEE Transactions on Consumer Electronics, Nov. 1991, vol. 37, No. 4, 8 pages.
J. Hofmann, Cable, Television, and the Consumer Electronic Bus, 9 pages.
Draft IS-60.04 Node Communications Protocol Part 6: Application Layer Specification, Rev. Apr. 18, 1996, 129 pages.
"The DSL Sourcebook", Paradyne Corporation, Copyright 2000, DSL-BOOK-3.0-0900, 98 pages.
Olshansky, "A Full Service Network for the Copper Plant", Telephony, 1985, pp. 52-60.
"TeleConcepts . . . Introduces the Just Plug It In Intercom System, "TeleConcepts Brochure, Newington, CT, 2 pages.
"Video Transmission System—Send Video Over Ordinary Wire—No Coax Required", Javelin Brochure, 2 pages.
TeleVideo Brochure, 2 pages.
Instant Network Rules on Phone Lines, Electronic Design, 1987.
O. Agazzi, et al., "Large Scale Integration of Hybrid-Method Digital Subscriber Loops, "IEEE Transactions on Communications, vol. COM-30, No. 9, Sep. 1982, pp. 2095-2108.
S.V. Ahamed, et al., "A tutorial on Two-Wire Digital Transmission in the Loop Plant", IEEE Transactions on Communications, vol. COM-29, No. 11, Nov. 1991, pp. 1554-1564.
J. Alves, "Data Over Voice—A Low Cost LAN Alternative", Communications Show and Conference, MECOM 87, January, pp. 13-15.
S.B. Andrews, "The Generic Digital Channel Concept", IEEE International Conference on Communications, 1985, Jun. 23-26, 1985, Chicago, IL, pp. 7.1.1-7.1.3.
G.W. Beene, "Design Considerations for a CO-Powered Distributed-Drop PCM Station Carrier", IEEE Transactions on Communications, vol. COM-30, No. 9, Sep. 1982, pp. 2022-2028.
A. Bienz, "1+1=1—Order Das Telefonnetz Als Datennetz", Sysdata, vol. 16, Aug. 28, 1985, pp. 41-42.
A. Brosio, et al., "A Comparison of Digital Subscriber Line Transmission Systems Employing Different Line Codes", IEEE Transactions on Communications, vol. COM-29, No. 11, Nov. 1981, pp. 1581-1588.

T.P. Byrne, et al., "Positioning the Subscriber Loop Network for Digital Services", IEEE Transactions on Communications, vol. COM-30, No. 9, Sep. 1982, pp. 2006-2011.
R.G. Cornell, et al., "Progress Towards Digital Subscriber Line Services and Signaling", IEEE Transactions on Communications, vol. COM-29, No. 11, Nov. 1981, pp. 1589-1594.
S. Davis, "Integrating Voice and Data: A Marriage of Convenience", Today's Office, vol. 24, No. 9, Feb. 1990, pp. 28-30.
M. Devault, et al., "Resaux Domestiques et Terminaux Audiovisuels Numeriques", L'Echo Des Recherches, No. 126, 1986, pp. 37-46.
H. Fuchs, et al., "Provide Full Duplex Transmission Over Two-Wire Subscriber Loops", Telephony, vol. 208, No. 11, Mar. 18, 1985, pp. 76, 77, 78 and 84.
H. Fukagawa, et al., "Bus Wiring System for residences", Matsushita Electric Works Technical Report, No. 36, Feb. 1988, pp. 31-35.
D. Glick, et al., "Providing Telco Customers Continuous Data Services", Telephony, vol. 205, No. 22, Nov. 1983, pp. 46, 50, 51, 54.
J.B. Hughes, et al., "A Receiver IC for a 1+1 Digital Subsciber Loop", IEEE Journal of Solid State Circuitry, vol. S.C. 20, No. 3, Jun. 1985 pp. 671-678.
R. Jelski, "Subscriber Subcarrier System—A New Life," Communications International, vol. 4, No. 5, May 1977, pp. 29-30.
A.J. Karia, et al., "A Digital Subscriber Carrier System for the Evolving Subscriber Loop Network", IEEE Transactions on Communications, vol. COM-30, No. 9, Sep. 1982, pp. 2012, 2014, 2015.
T. Masuda, et al., "2-Wire Video Intercom System with Telephone", National Technical Report, vol. 37, No. 6, Dec. 1991, pp. 74-80.
T. Matthews, "Telecomm System is Nerve Center", Infosystems, vol. 31, No. 5, May 1984, pp. 68-69.
J. K. Merrow, "A New Approach to Integrating Local Area Data and Voice Transmission," Telephony, vol. 250, No. 17, Oct. 1983, 2 pages.
H. Morgan, "Two-Wire Full-Duplex Modern Simplifies Voice and Data Networking", Mini-Micro Systems, vol. 17, No. 3, Mar. 1984, 4 pages.
R. Murakoshi, "Home Automation", Journal of the Society of Instrument and Control Engineers, vol. 23, No. 11, Nov. 1984, pp. 955-958.
R.D. Nash, et al., "Simultaneous Transmission of Speech and Data Over An Analog Telephone Channel", GLOBECOM '85. IEEE Global Telecommunications Conference. Conference Record. Communication Technology to Provide New Services, Dec. 25, 1985, New Orleans, Louisiana, pp. 4.2.1-4.2.4.
H. Ogiwara, et al., Design Philosophy and Hardware Implementation for Digital Subscriber Loops, IEEE Transactions on Communications, vol. COM-30, No. 9, Sep. 1982, pp. 2057-2065.
J.L. Pernin, "Related Evolution of Subscribeer Loop Plant and Residential Data Transmission Needs", Intelcon 79 Exposition Proceedings, Feb. 26-Mar. 2, 1979, Dallas, Texas, pp. 596-599.
R.A. Tatum, "Project Victoria—the 7-in-1 Solution", Telephone Engineer and Management, vol. 90, No. 1, Jan. 1, 1986, pp. 47 and 50.
A. Teshima, et al., "Still Video Telecommunication Over the Analog Telephone Network", Journal of the Institute of Television Engineers of Japan, vol. 42, No. 11, Nov. 1988, pp. 1162-1167.
S.R. Treves, et al., "Text, Image and Data Integration in a Distributed Control Digital Voice Switching System", International Switching Symposium—ISS '81 CIC, Sep. 21-25, 1981, Motreal, Quebec, Canada, pp. 1-7.
T. Tsuda, et al., "Experimental In-House Multiservice Communication System", Fujitsu Scientific and Technical Journal, vol. 16, No. 3, Sep. 1980, pp. 29-45.
K. Urui, "Integrated Voice/Data Digital EPBX", Toshiba Review, No. 150, Winter 1984, pp. 30-33.
A.F. Van Den Berg, et al., "Principles van de Modem: Technieken en Specificaties", Elektronica, vol. 32, No. 5, Mar. 9, 1984, pp. 11, 13, 15, 17, 19 and 21.
M.G. Vry, et al., "Digital 1+1 Systems for Local Network Enhancement", Conference on Communications Equipment and Systems, Apr. 20-22, 1982, Birmingham, United Kingdom, pp. 61-64.
M.G. Vry, et al., "The Design of a 1+1 System for Digital Signal Transmission to the Subscriber", NTG-Bachberichte. vol. 73, 1980, pp. 36-40.

J.A. Webb, "A New Concept in Data-Above-Voice (DAV)", PTC '86: Evolutions of the Digital Pacific. Telecommunications—Asia, Americas, Pacific: PTC '86 Proceedings, Jan. 12-15, 1986, Honolulu, Hawaii, pp. 260-265.

K. Yamamoto, "A Home Terminal System Using the Home Area Information Network", IEEE Transactions on Consumer Electronics, vol. CE-30, No. 4, Nov. 1984, pp. 608-616.

"Centrex LAN Can Provide Advanced Network Capabilities Over the Existing Telephone Wires", Communications News, vol. 25, No. 6, Jun. 1988, p. 27.

"Data Over Voice is Solution for Corporate Network", Telephone Engineer and Management, vol. 91, No. 9, May 1, 1987, pp. 67-69.

"Data Carrier System Allows Simultaneous Voice/Data Transmission for PABX Telephone Systems", Computer Design, vol. 21, No. 5, May 1982, pp. 68 and 70.

"Computerized Telephone System Integrates Voice and Data Switching", Computer Design, vol. 20, No. 4, Apr. 1981, 6 pages.

"AT&T's Systemax Premises Distribution System Solves Networking Problems", Fiber Optics Magazine, vol. 12, No. 4, Jul.-Aug. 1990, pp. 14-16.

M.M Anderson, "Video Services on Copper", Conference: ICC 91, International Conference on Communications Conference Record, Jun. 2-26, 1991, Denver, CO, pp. 302-306.

M. Bastian, "Voice-Data Integration: An Architecture Perspective," IEEE Communications Magazine, vol. 24, No. 7, Jul. 1986, pp. 8-12.

M. Boubekker, "Bandwidth Reduction for the Transmission of Sign Language Over Telephone Lines", Proceedings of the SPIE-The International Society for Optical Engineering, vol. 1001, Part 1, 1988, pp. 223-230.

S. Bramblett, "Connect Terminals to Your CPU Over PBX Telephone Lines", EDN, vol. 31, No. 5, Mar. 6, 1986, pp. 239-243, 245, 246 and 248.

G.D. Carse, "New and Future Technologies in the Local Telephone Network: The Victoria System", Conference: IEEE International Conference on Communications '86, ICC '86: Integrating the World Through Communications Conference Record, Jun. 22-25, 1986, Toronto, Ontario, Canada, pp. 410-412.

C. Dougligeris, et al., "Communications and Control for a Home Automation System", Conference: IEEE Proceedings of the Southeastcon '91, vol. 1, pp. 171-175.

D.G.J. Fanshawe, "Architures for Home Systems", Conference: IEEE Colloquium on Home Systems—Information, Entertainment and Control, Oct. 1, 1990, London, United Kingdom, pp. 3/1-3/3.

N.C. Hightower, "Integrated Voice, Data and Video in the Local Loop", IEEE 1986, pp. 915-919.

M. Inoue, et al., "A Home Automation System", IEEE Transactions on Consumer Electronics, vol. CE-31, No. 3, Aug. 1985, pp. 516-527.

J.W. Lechleider, "Study of the Feasibility and Advisability of Digital Subscriber Lines Operating at Rates Substantially in Excess of the Basic Access Rate", T1E1.4 Technical Subcommittee (T1E1.4/89-070), 1 page.

S. Motoyama, et al., "A Subscriber Loop Multiplexing System for Integrated Service Digital Networks", Conference: NTC '81, IEEE 1981 National Telecommunications Conference, Innovative Telecommunications-Key to the Future, Nov. 29-Dec. 3, 1981, New Orleans, Louisiana, pp. D5.1.1-D5.1.5.

G. Neumann, Flexible and Cost-Minimising System Concept (Ericsson Digial PABX MD 110), NET Nechrichten Elektronik-Telematik, Special Issue, Mar. 1988, pp. 11, 12, 14 and 15.

H. Nishi, et al., "Control of a Star/Bus Key Telephone System", NTT R & D, vol. 39, No. 8, 1990 pp. 122, 1222, 1224-1228.

A. Pietrasik, et al., "Subscriber Carrier Telephony System 1+1", Wiadomosci Telekomunikacyjne, vol. 17, No. 7-8, Jul.-Aug. 1977, pp. 183-198.

V. Punj, "Broadband Applications and Services of Public Switched Networks", IEEE Transactions on Consumer Electronics, vol. 35, No. 2, May 1989, pp. 106-112.

T. Sodeyama, et al., "Intelligent House", Journal of the Institute of Electronics, Information and Communication Engineers, vol. 72, No. 9, Sep. 1989, pp. 1024-1026.

H. Tanaka, et al., "Telecontrol System VJ-501", National Technical Report, vol. 32, No. 6, Dec. 1986, pp. 809-817.

C. Valenti, "Study of the Feasibility and Advisability of Digital Subscriber Lines Operating at Rates Substantially in Excess of the Basic Access Rate", T1E1.r Technical Subcommitte (T1E1.4/91-115), pp. 2 and 4.

D. L. Waring, "The Asymmetrical Digital Subscriber Line (ADSL): A New Transport Technology for Delivering Wideband Capabilities to the Residence", Globecom '91, IEEE, pp. 1979-1986.

K. Yamamoto, et al., "New Home Telephone System Using Japanese Home Bus System Standard," IEEE Transactions on Consumer Electronics, vol. 35, No. 3, Aug. 1989, pp. 687-697.

T. Yamazakli, et al., "Home Appliance Technologies," NEC Research and Development, No. 96, Mar. 1990, pp. 292-299.

Funkschau, "CEBus: US Households are Being Networked", No. 9, Apr. 1989, pp. 45-47

"Shared Services (Data/Voice Network)", Communications News, vol. 25, No. 11, Nov. 1988, pp. 46-47.

Freeman, "Telecommunication Transmission Handbook", 2.sup.nd Ed., Cover, 1981, pp. xi-xxvii, Chapter 3 (pp. 79-127), Chapter 5 (pp. 172-252), Chapter 6 (pp. 253-288).

A. Artom, et al., "The Possible Use Of Customer Loop For New Services During The Transition From Analogue To Digital", Revue F.I.T.C.E., Mar.-Apr. 1981, vol. 20, No. 2, pp. 50-56.

A. Artom, et al., "Medium-Term Prospects for New Servies to the Telephone Customers," Conference Record, Jun. 14-18, 1981, Int'l Conf. On Communications, Denver, CO., pp. 14.4.1-14.4-6.

Hoe-Young NOH, "Home Automation", Korea Information Science Society Review, Apr. 1989, vol. 7 No. 2, pp. 40-44, Republic of Korea. (Translation Provided).

M. Coronaro, et al., "Integrated Office Communication System," Electrical Communication, 1986, pp. 17-22, vol. 60, No. 1, FACE Research Center, Pomezia, Italy.

Chow, et al., "A Multi-drop In-House ADSL Distribution Network"; IEEE 1994, pp. 456-460.

English Language Abstract for Japanese Patent 1-27358 (64-27358) Jan. 30, 1989.

Bellcore: Request For Information: Asymmetrical Digital Subscriber Line (ADSL) Systems That Support Simplex High-Bit-Rate Access and POTS In The Copper Loop Plant; Jun. 1991.

Twisted Pair Physical Layer and Medium Specification; Revision: IS-60 Aug. 18, 1995 (49 pages).

Introduction to the CEBus Standard; Revision Feb. 5, 1995 Draft Copy (19 pages).

Compaq to Ride The CEBus; by Mark Hachman, EBN Jan. 22, 1996 (1 page).

CEBus Router Testing; IEEE Transactions on Consumer Electronics Nov. 1991, vol. 37 No. 4 (8 pages).

Broadband Network Technology—AN Overview for the Data and Telecommunications Industries; by Edward Cooper, Copyright 1984, pp. 51-52 (4 pages).

Technical Report TR-001 ADSL Forum System Reference Model; May 1996 (6 pages).

DSLPipe User's Guide; by Ascend Communications, Jun. 3, 1997 (245 pages).

DSLPipe Reference Guide; by Ascend Communications, Jun. 2, 1997 (162 pages).

Ascend DSLPipe-S Features; Posted May 12, 1997 (2 pages).

Ascend DSLPipe-S Specifications; (2 pages).

Broadband Digitial Subscriber Line—A Full Service Network for the Copper Plant; Telephony / Jun. 12, 1995, vol. 228 No. 24 (8 pages).

Commtek Intros Video over UTP; Communications Week, Feb. 10, 1992 (3 pages).

Aurelio Amodei, et al., "Increasing the Throughput of the HomePNA MAC Protocol, IEEE, Proceedings of the 29th Annual IEEE International Conference on Local Computer Networks (LCN '04), 8 Pages", Nov. 1, 2004, 8 pages(s), None. cited by other.

"Home Phoneline Networking Alliance", Interface Specification for HomePNA 2.0 10M8 Technology Link Layer Protocol, (Dec. 1, 1999), pp. 1-39.

"Home Phoneline Networking Alliance", Interface Specification for HomePNA 2.0 10M8 Technology, (Dec. 1, 1999), pp. 1-77.

Paola Bisaglia, et al., Receiver Architectures for HomePNA 2.0, Hewlett Packard Laboratories, Bristol, U.K., Oct. 17, 2001.

Loh, L.; Ozturk, Y.; Quality of Support and Priority Management in HomePNA 2.0 Link Layer.quadrature..quadrature.Computers and Communication; Jun. 30-Jul. 3, 2003. (ISCC 2003). Proceedings. Eighth IEEE International Symposium; pp. 861-866 vol. 2.

Phoneline / HPNA / HomePNA Networks, http://www.homenethelp.com/web/howto/HomeNet-HPNA.asp (visited Jul. 29, 2003) (3 pages).

Anonymous, HomePNA Specification 1.0 Field Tests Status, Mar. 1999, Home Phoneline Networking Alliance, Inc, pp. 1-6.

21145 Phoneline/Ethernet LAN Controller, Intel Corporation .COPYRGT. 1999, http://developer.intel.com/design/network/21145.htm.

Simple, High-Speed Ethernet Technology For The Home, White Paper, Home Phoneline Networking Alliance, Jun. 1998, pp. 1-11.

Information on Home PhoneLine Networking Alliance (Home PNA), dated Jun. 1998 and before.

* cited by examiner

Figure 1 (Prior-Art)

Figure 2 (Prior-Art)

Figure 3 (Prior-Art)

Figure 4 (Prior-Art)

Figure 5 (Prior-Art)

Figure 6 (Prior-Art)

TELEPHONE COMMUNICATION SYSTEM OVER A SINGLE TELEPHONE LINE

FIELD OF THE INVENTION

The present invention relates to the field of telephony communication networks, and, more specifically, to the networking of telephone sets within a building over single telephone line.

BACKGROUND OF THE INVENTION

There is a growing need for expanded telephone communication capabilities within the home. This need is driven by two major factors; the increasing use of additional outside lines and the desirability of exchange functionality within the home, such as for intercom systems, Telephone Wiring An in-home telephone service usually employs two or four wires, and is accessed via telephone outlets into which the telephone sets are connected. FIG. 1 shows the wiring configuration of a prior-art telephone system 10 for a residence or other building, wired with a residential telephone line 5. The residential telephone line 5 consists of single wire pair which connects to a junction box 16, which in turn connects to a Public Switched Telephone Network (PSTN) 18 via a cable 17a, terminating in a public switch 19, which establishes and enables telephony from one telephone to another. The term "analog telephony" as used herein denotes traditional analog low-frequency audio voice signals typically under 3 KHz, sometimes referred to as "POTS" ("Plain Old Telephone Service"), whereas the term "telephony" in general denotes any kind of telephone service, including digital service such as Integrated Services Digital Network (ISDN). The term "high-frequency" as used herein denotes any frequency substantially above such analog telephony audio frequencies, such as that used for data. ISDN typically uses frequencies not exceeding 100 KHz (typically the energy is concentrated around 40 KHz). The term "telephone line" as used herein denotes electrically-conducting lines which are intended primarily for the carrying and distribution of analog telephony, and includes, but is not limited to, such electrically-conducting lines which may be pre-existing within a building and which may currently provide analog telephony service. The term "telephone device" as used herein denotes, without limitation, any apparatus for telephony (including both analog telephony and ISDN), as well as any device using telephony signals, such as fax, voice-modem, and so forth.

Junction box 16 is used to separate the in-home circuitry from the PSTN and is used as a test facility for troubleshooting as well as for wiring new in the home. A plurality of telephones 13a and 13b connects to telephone line 5 via a plurality of telephone outlets 11a, 11b, 11c, and 11d. Each outlet has a connector (often referred to as a "jack"), denoted in FIG. 1 as 12a, 12b, 12c, and 12d, respectively. In North America, RJ-11 is commonly used. Each outlet may be connected to a telephone unit via a connector (often referred to as a "plug"), denoted in FIG. 1 (for the two telephone units 13a and 13b illustrated) as 14a and 14b, respectively. It is also important to note that lines 5a, 5b, 5c, 5d, and 5e are electrically different segments of the same paired conductors.

While network 10 exhibits serial or daisy-chained topology wherein the wiring is serialized from all outlet to the next one only, other topologies such as star, tree or any arbitrary topology may also be used. The telephone wiring system within a residence, however, is always composed of wired media: two or four copper wires, and outlets which provide direct access for connecting to these wires.

Additional Subscriber Lines.

FIG. 2 illustrates a telephone network 20 in a home, where an additional subscriber line 17b is required to be added to existing line 17a. Additional line 17b comes from exchange 18 to home junction-box 16. In order to provide access to additional line 17b, a new outlet 11e must be installed. In addition, a new telephone line 6a must be installed, routed from junction box 16 to the outlet 11e. In such an installation, a telephone set 13c is connected using a cable 15c, via connectors 14c and 12e to the added subscriber line.

Alternatively, the new wiring 6a can be routed together and as part of existing wiring 5, using the same in-wall routing. In such a case, either several new telephone outlets need to be installed, or the existing outlets need to be replaced with ones employing two or more telephone connectors.

In both the cases described above, new wiring must be added. The routing and installation of such wiring is both labor-intensive and expensive. Adding the new wiring on the exterior of the wall is less expensive, but may be aesthetically undesirable.

In buildings where four wires (two pairs) have been installed, adding a second subscriber line is quick and easy. The second pair of the existing wiring is used for the second subscriber line, thus obviating the need for routing additional wires. However, the same problem of needing additional wires is encountered in this case when a third or fourth subscriber line is required. In general, additional wiring is required whenever adding a new subscriber line to a home exceeds the capacity of the existing wiring.

FIG. 2 illustrates the case where the added subscriber lines involve the use of dedicated wiring from the exchange to the home for each such added subscriber line. New technology, however, enables multiple voice channels to be carried over a single twisted-pair (local-loop). Specifically, Digital Subscriber Line (DSL) technologies are available. For example, ISDN-BRA (Integrated Services Digital Network—Basic Rate Access, commonly referred to as ISDN) can carry two voice channels over a single twisted pair, HDSL (High Bit rate Digital Subscriber Line) supports up to 16 voice channels, and HDSL2 supports up to 30 voice channel over a single twisted pair. These and other such technologies commonly employ two modems, connected to each end of the twisted pair, as shown in network 30 in FIG. 3. The pair 17 in the local loop interfaces in the exchange side with an exchange terminal unit 32, which communicates over the local loop pair to a remote terminal unit 31, located at the customer side of the cable. Remote terminal unit 31 in turn provides subscriber line interfaces 17a and 17b, connected to junction box 16. In an alternate configuration, the voice channels are multiplexed within a digital stream, such as PCM highway, ATM or other buses.

The recent move towards de-regulation has enabled the subscriber to receive telephone services from providers other than the traditional telephone companies. One example is the competitive carriers in the United-States. In addition, non-telephone businesses, such as cable television and satellite-based network providers, are starting to offer telephone services. Thus, the customer may select added subscriber lines to be supplied by different service providers. FIG. 4 illustrates a configuration for such a customer, employing a telephone network 40. A first telephone line is supplied by a traditional telephone company as shown in FIG. 1 and previously described. However, a second telephone line is provided by a non-original telephone provider, which connects to non-telephone network 41. For example, this can be a cable television network. The voice channel is provided via a remote terminal unit 42, which provides the additional telephone line 6a, and communicates with the non-telephone network 41. For example, the remote terminal unit 42 can be part of Set-Top Box or Cable Modem.

Exchange Features

As used herein, the phrase "PABX-type features", or the idiomatic equivalent thereof, is intended to encompass features including, but not limited to: hold/call pick up; call transfer between subsets; conference calls; calls coming from, or going to, a central office exchange; ringing on all subsets; repertory dialing; memory dialing. A rapid expansion in residential-oriented telephone systems and equipment has been developing to satisfy an ever growing number of needs related to telephone communication. One particular need in many residences is the ability to selectively communicate among a number of telephone sets all of which are connected via the single central office telephone line that accesses the residence. In addition, other identified needs of residential subscribers are similar to those of businesses having a private automatic branch exchange (PABX). However, most such existing exchanges require 'star' topology, in which all outlets are directly connected to the exchange. While this topology is supported in some residences, most buildings do not employ such a topology, as the example in FIG. 1 illustrates. In such a case, a private automatic branch exchange cannot easily be employed, unless effort is made to modify the wiring into 'star' topology. U.S. Pat. Nos. 4,821,319, 4,459,434, 5,090,052, 5,596,631, 5,781,622 and 6,038,300, as well as other patents classified under US Classes 379/177 and 379/363, disclose a few embodiments enabling limited exchange functionalities in a residence using single wire pair.

Data over Telephone Lines

There is a requirement for simultaneously using the existing telephone infrastructure for both telephone and data networking. In this way, the task of establishing a new local area network in a home or other building is simplified, because there would be no additional wires to install. U.S. Pat. No. 4,766,402 to Crane (hereinafter referred to as "Crane") teaches a way to form a LAN over two-wire telephone lines, but without the telephone service.

The concept of frequency domain/division multiplexing (FDM) is well-known in the art, and provides means of splitting the bandwidth carried by a wire into a low-frequency band capable of carrying an analog telephony signal and a high-frequency band capable of carrying data communication or other signals. Such a mechanism is described, for example, in U.S. Pat. No. 4,785,448 to Reichert et al (hereinafter referred to as "Reichert"). Also widely used are xDSL systems, primarily Asymmetric Digital Subscriber Loop (ADSL) systems.

As another example, relevant prior-art in this field is disclosed in U.S. Pat. No. 5,896,443 to Dichter (hereinafter referred to as "Dichter"). Dichter suggests a method and apparatus for applying frequency domain/division multiplexing (FDM) technique for residential telephone wiring, enabling simultaneously carrying telephone and data communication signals. The bandwidth enabled by the wiring is split into a low-frequency band capable of carrying an analog telephony signal and a high-frequency band capable of carrying data communication signals. In such a mechanism, the telephone service is not affected, while data communication capability is provided over existing telephone wiring within a home.

The Dichter network is illustrated in FIG. 5, which shows a network 50 serving both telephones and providing a local area network of data units. Data Terminal Equipment (DTE) units 24a, 24b, and 24c are connected to the local area network via Data Communication Equipment (DCE) units 23a, 23b, and 23c, respectively. Examples of Data Communication Equipment include modems, line drivers, line receivers and transceivers (the term "transceiver" as used herein denotes a combined transmitter and receiver). DCE units 23a, 23b, and 23c are respectively connected to high pass filters (HPF) 22a, 22b, and 22c. The HPF's allow the DCE units access to the high-frequency band carried by telephone-line 5. In a first embodiment (not shown in FIG. 5). telephones 13a, 13b, and 13c are directly connected to telephone line 5 via connectors 14a, 14b, and 14c, respectively. However, in order to avoid interference to the data network caused by the telephones, in a second embodiment (shown in FIG. 5) low pass filters (LPF's) 21a, 21b, and 21c are added to telephones 13a, 13b, and 13c from telephone line 5. Furthermore, a low pass filter may also be connected to Junction Box 16, in order to filter noises induced from or to the PSTN wiring 17. It is important to note that lines 5a, 5b, 5c, 5d, and 5e are electrically different segments of the same paired conductors.

Additional prior-art patents in this field can be found under US Class 379/093.08, which relates to carrying data over telephone wiring without any modifications made to the telephone wiring (e.g. wires and outlets). U.S. Pat. No. 5,841,360 and U.S. patent applications Ser. Nos. 09/123,486 and 09/357,379 to the present inventor are the first to suggest modifying the telephone wiring, by means of splitting the wiring into distinct segments, each of which connects two telephone outlets. In this way, the network is modified front 'bus' topology into multiple 'point-to-point' segments, enabling superior communication characteristics.

Part of such a network 60 is shown in FIG. 6, describing outlets 31a and 31b, substituting outlets 11 of FIG. 1. The telephone wiring 5 is split into distinct segments 5a, 5b, and 5c. Low-Pass Filters (LPF) and High-Pass Filters (HPF) are coupled to each wire segment end, in order to split between the telephony and the data signals. As shown in FIG. 6, LPF's 21b and 21c are respectively attached to opposite ends of the wiring segment 5b. The LPF's arc designed to allow passing of the telephony signals, and are connected together thus offering a continuous path for the telephony signals. Access to the telephony signals is made via connectors 12a and 12b in the outlets, into which telephone devices 13a and 13b are connected via connectors 14a and 14b respectively. Thus, the telephony service is fully retained. The data signals, carried in the high part of the spectrum, are accessed via HPF's 22b and 22c, also coupled respectively to opposite ends of the telephone wire segment 5b. HPF's 22a and 22d are connected to the ends of the wire segments 5a and 5c respectively. Each HPF is connected to a modem 23, which transmits and receives data signals over the telephone wiring. Modems 23a, 23b, 23c, and 23d are connected to HPF's 22a, 22b, 22c and 22d respectively. Data units 24a and 24b are connected to the outlets 31a and 31b respectively, via a respective connector (not shown in the Figure) in each outlet. The data units are coupled via a respective DTE interface in the outlet. Outlets 31a and 31b comprise DTE interfaces 29a and 29b respectively. The three data streams in each outlet, two from each modem and one from the DTE, are handled by an adapter 28a and an adapter 28b, which serve outlets 31a and 31b, respectively. While FIG. 6 describes an embodiment wherein all the components for the relevant functions are housed within the outlet, other embodiments are also possible, wherein only some of the components for these functions are contained within the outlet.

Life-Line

The term "life-line" as used herein denotes the basic use of the telephone service for emergency purposes. As such, it is required that a malfunction of any other system or service (e.g. electricity) will not degrade the telephone system capability. In practical terms, this means that as long as an operational telephone set is connected to the exchange via continuous two wires, the telephone service will be maintained, even in the case of power outage.

There is thus a widely recognized need for, and it would be highly advantageous to have, a means for implementing a telephone system in-home, wherein the telephone units can be networked within the home as well as to multiple external subscriber lines, without requiring the installation of additional wires within the home. This goal is met by the present invention,

SUMMARY OF THE INVENTION

The present invention discloses an improved telephone system within a building over a single telephone line. The telephone line within the building is used as a medium for a communication network carrying multiple voice channels in a TDM (Time Domain multiplexing) fashion. New wiring or a preexisting telephone lines may be used. In each outlet, conversion between one or more of the data voice channels to and from a standard analog telephone signal (POTS) is performed by a module. The exchange features previously described are implemented by digitally routing the voice channels between the outlets. Signals from external telephone feeders (connections between the telephone service provider's central office and the line within the building) can also be digitized by a module and routed within the communication network. In this way, standard analog telephone equipment and signals therefrom can be interfaced by the modules and used in a multiple voice channel network over a single telephone line.

Two types of communication network are supported. In the first configuration, the telephone wiring is retained in the typical continuous arrangement, thereby forming a bus-type network, where the module within each outlet has a single telephone-line modem. In the second configuration, the telephone lines are broken at each outlet, and a telephone-line modem is coupled to each wire end, thereby forming point-to-point communication segments between each pair of connected outlets.

The module that couples the telephone line to the telephone interface, or any of the components of the module, can be fully integrated into the outlet, partially integrated into the outlet, or externally configured.

Life-line functionality is facilitated by using passive filters to separate the available line bandwidth into a low band and a high band. The high band is used by the multiple voice channel communication network, while the low band is used for carrying a standard analog telephone service without using any active components. In such a case, each outlet may contain a life-line telephone interface and one or more telephone interfaces for the voice channels carried by the communication network.

Therefore, the present invention provides for use with a telephone installation within a building, the telephone installation having a line and external connections between the line and a central office of a telephone service provider, a system for connecting to the telephone installation so as to allow more voice channels to be carried over the line without requiring modification or extension of the telephone installation, the system comprising at least two modules for coupling to the telephone line, wherein said modules are operative for:
  (i) converting between at least one standard analog telephone signal and at least one time-domain multiplexed voice channel; and
  (ii) interfacing with standard analog telephone equipment and signals therefrom.

Furthermore, according to the present invention there is provided a kit for upgrading a pre-existing telephone installation having a line within a building so as to allow more voice channels to be carried over the line without requiring modification or extension of the telephone installation, the kit including:
  (i) at least one outlet, said outlet having a connection for coupling to the line; and
  (ii) a module operative for:
    a) converting between at least one standard analog telephone signal and at least one time-domain multiplexed voice channel; and
    b) interfacing with standard analog telephone equipment and signals therefrom.

Moreover, according to the present invention there is provided a method for upgrading a pre-existing telephone installation having a line within a building, so as to allow more voice channels to be carried over the line without requiring modification or extension of the telephone installation, the method including the steps of:
  (i) providing a telephone line modem;
  (ii) providing a subscriber-line interface;
  (iii) providing a drop-and-insert multiplexer for interfacing between the voice channels and said subscriber-line interface;
  (iv) providing an outlet; and
  (v) equipping said outlet with said telephone-line modem, said subscriber-line interface and said drop-and-insert multiplexer.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
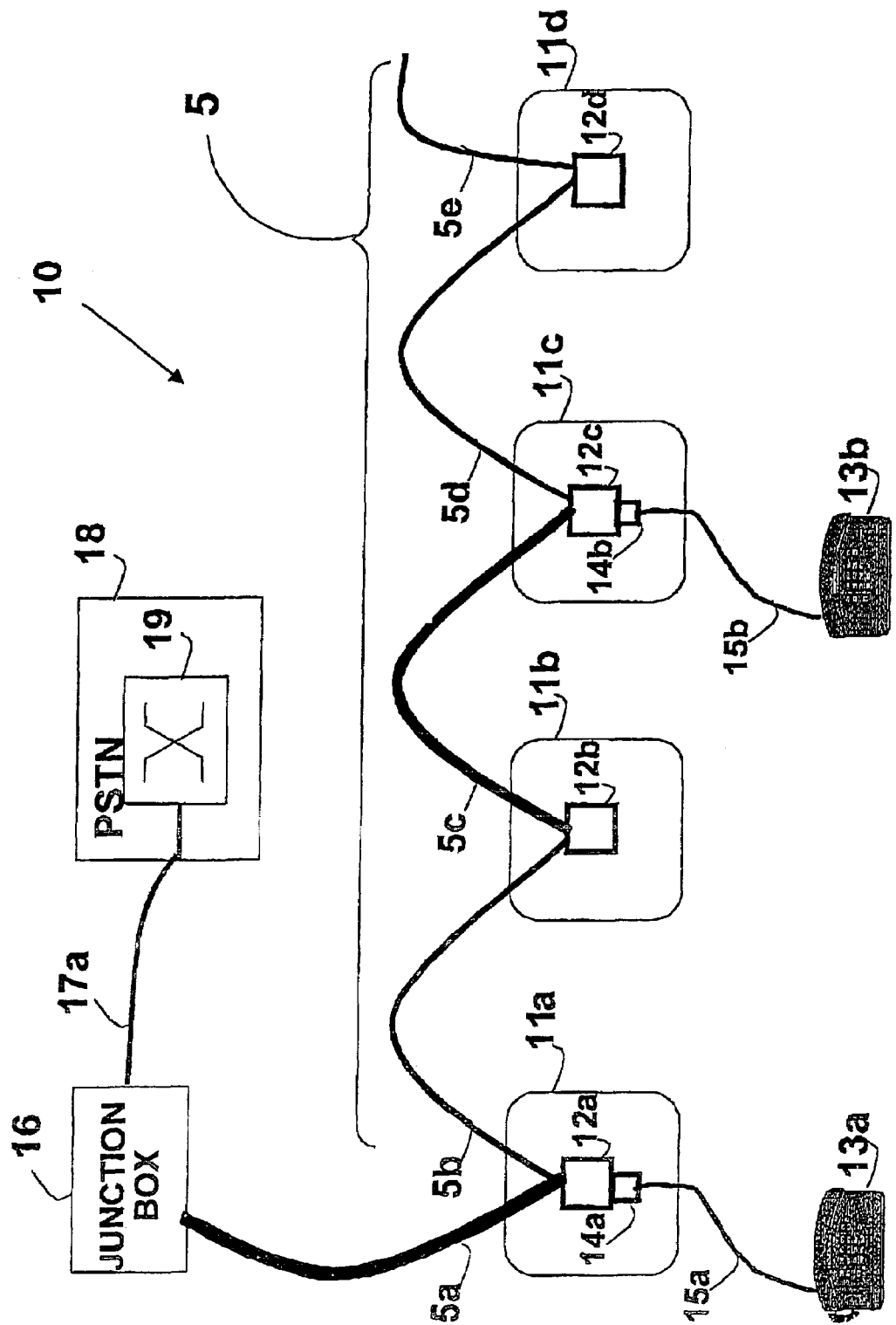
FIG. 1 shows a common prior art telephone line wiring configuration for a residence or other building.

The principles and operation of a network according to the present invention may be understood with reference to the drawings and the accompanying description. The drawings and descriptions are conceptual only. In actual practice, a single component can implement one or more functions; alternatively, each function can be implemented by a plurality of components, and circuits. In the drawings and descriptions, identical reference numerals indicate those components which are common to different embodiments or configurations.

Figure 5:
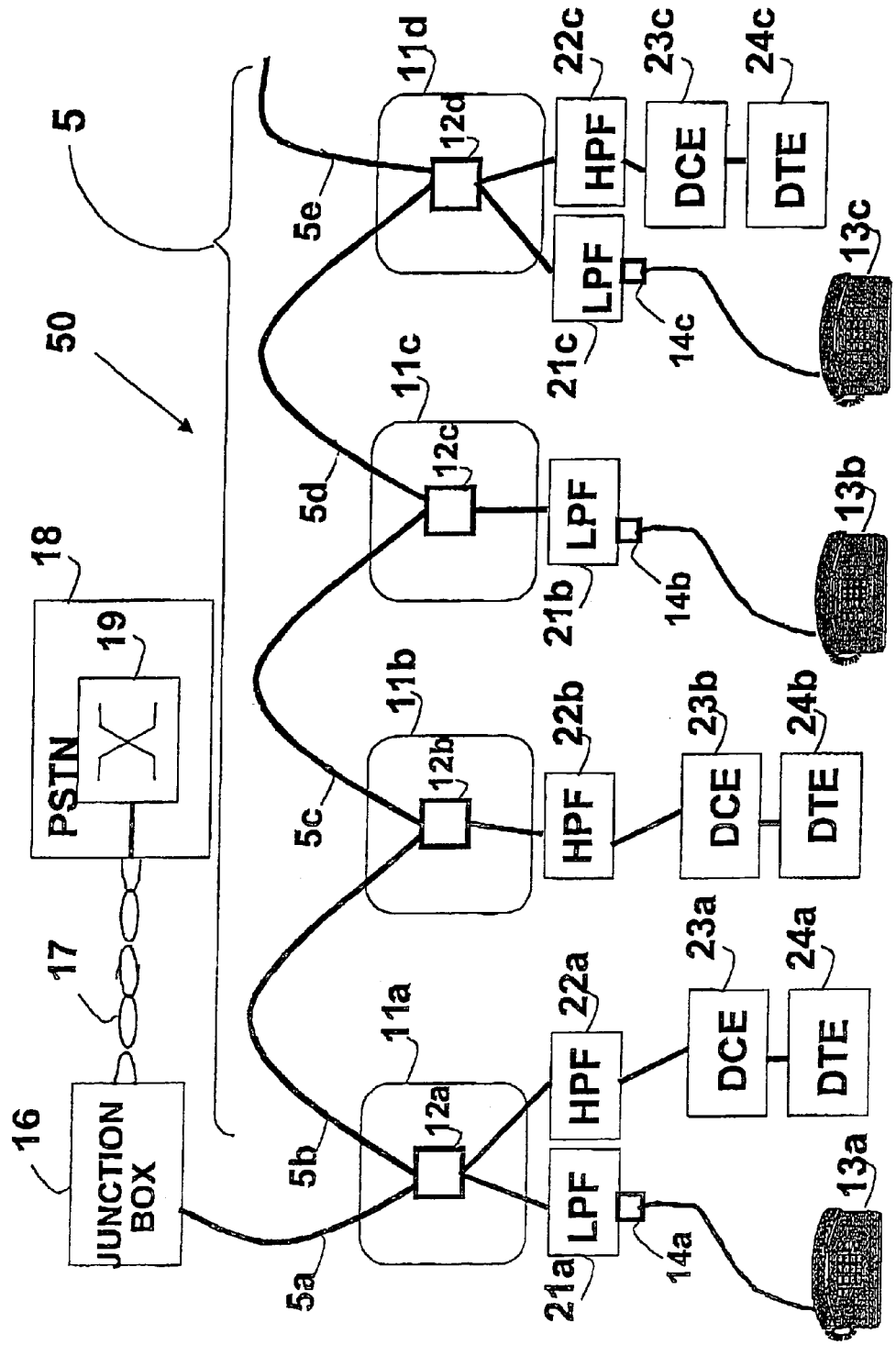
FIG. 5 shows a first prior-art local area network based on telephone line wiring for a residence or other building.
Figure 7:
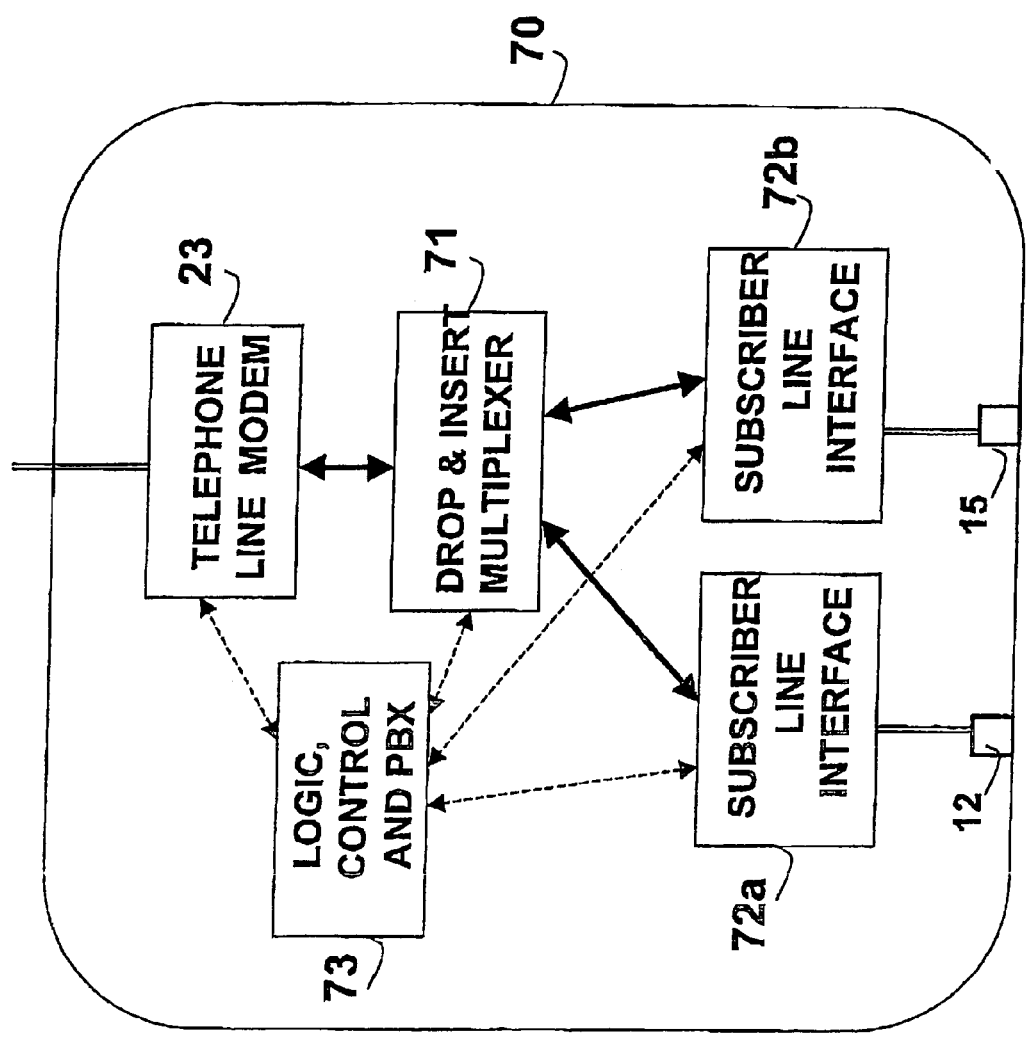
FIG. 7 shows a module according to a first embodiment of the present invention.

A first embodiment of the present invention is based on an adapter module (hereinafter denoted as a "module"), which enables the connection of a standard telephone set to the data communication network over the telephone line. FIG. 7 illustrates the functionality of a module 70. Module 70 has two ports: one for connecting to the telephone line and the other for connecting to one or more telephone sets. The module interfaces the data communication network over the telephone line by a telephone line modem 23, which can use DCE 23a as in Dichter network 50 (FIG. 5). The data communication network carries multiple digitized (e.g. PCM) voice channels. A drop-and-insert multiplexer 71 installs and extracts voice channels to and from the digital data stream in the data communication network. The voice channels to be handled by module 70 are managed by a logic, control and PBX unit 73. Each voice channel is converted into single telephone (POTS) interface via a subscriber line interface 72a, which converts the digital voice channel stream into an analog interface, capable of connecting to a standard telephone set via a connector 12. In order to facilitate a second telephone to be connected to the module 70, an additional subscriber line interface 72b is added, and couples to multiplexer 71 and to the logic, control and PBX unit 73. Subscriber line interface 72b handles as additional distinct voice channel. An additional telephone set can connect to subscriber line interlace 72b via a connector 15. While the module 70 is described as having two-line support via connectors 12 and 15, to subscriber line interfaces 72a and 72b respectively, the same arrangement also applies to a single-line interface, from which subscriber line interface 72b and connector 15 are omitted. It is also clear that module 70 can support more than two such interfaces, where each such additional such interface requires an additional subscriber line and connector, as well as a respective support by drop-and-insert multiplexer 71.

Module 70 may also contain additional logic, control, processing, data storage, and a power-supply. Except for facilities such as logic, control, and PBX capabilities, which are handled by unit 73, such additional functions are performed by other components not shown in FIG. 7.

Figure 8:
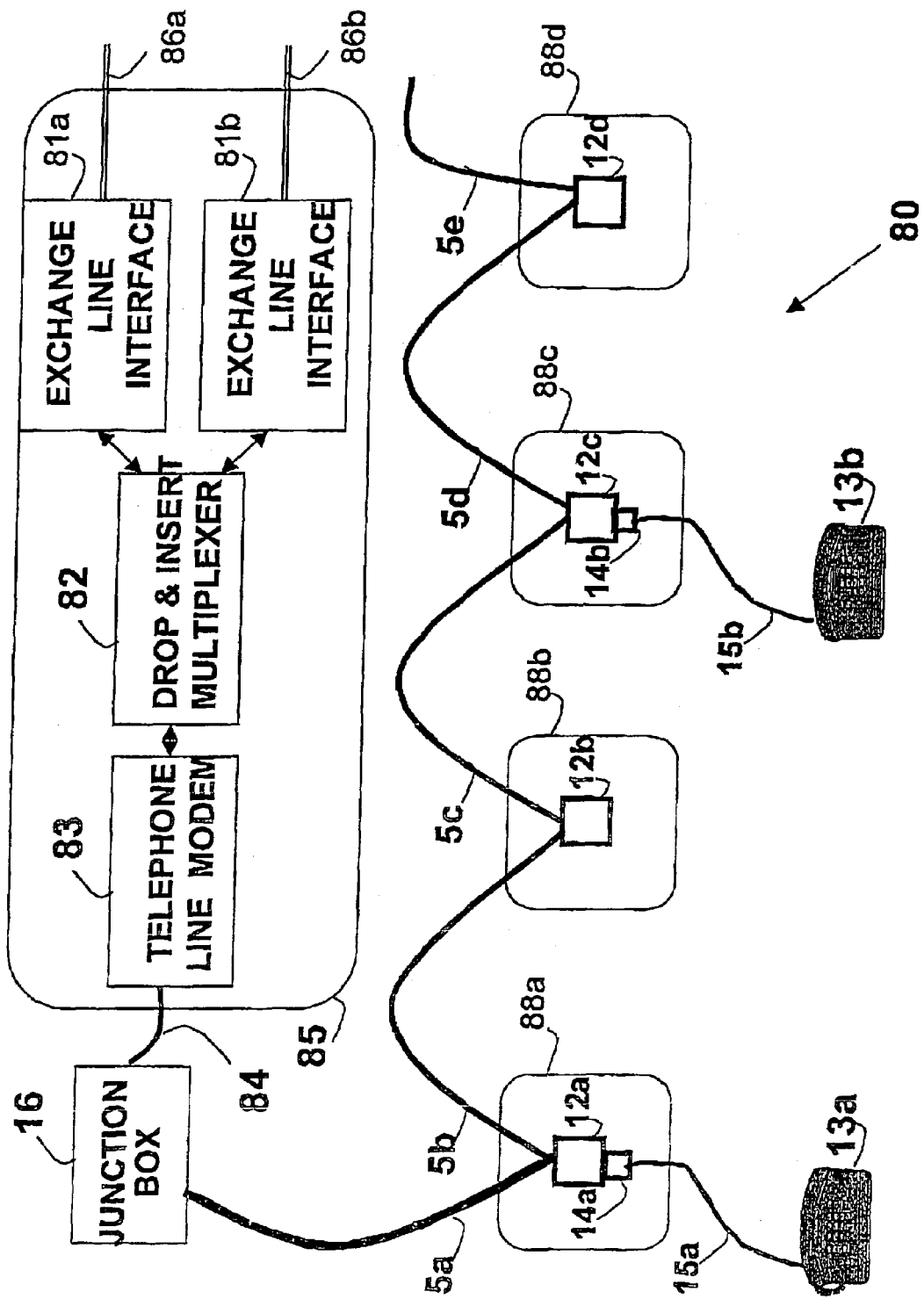
FIG. 8 shows a telephone network according to the first embodiment of present invention.

A first embodiment of a network of the present invention is based on the Dichter network. FIG. 8 illustrates a network 80, and is based upon modules, such as module 70 (FIG. 7), where each module allows a single telephone set to interface via connector 12. Each such module 70 is fully housed and integrated within a telephone outlet, such as outlets 88a, 88b, 88c, and 88d, where telephone line modem 23 connects to the telephone line port of the outlet, and the telephone connector connects to the telephone set.

Figure 2:
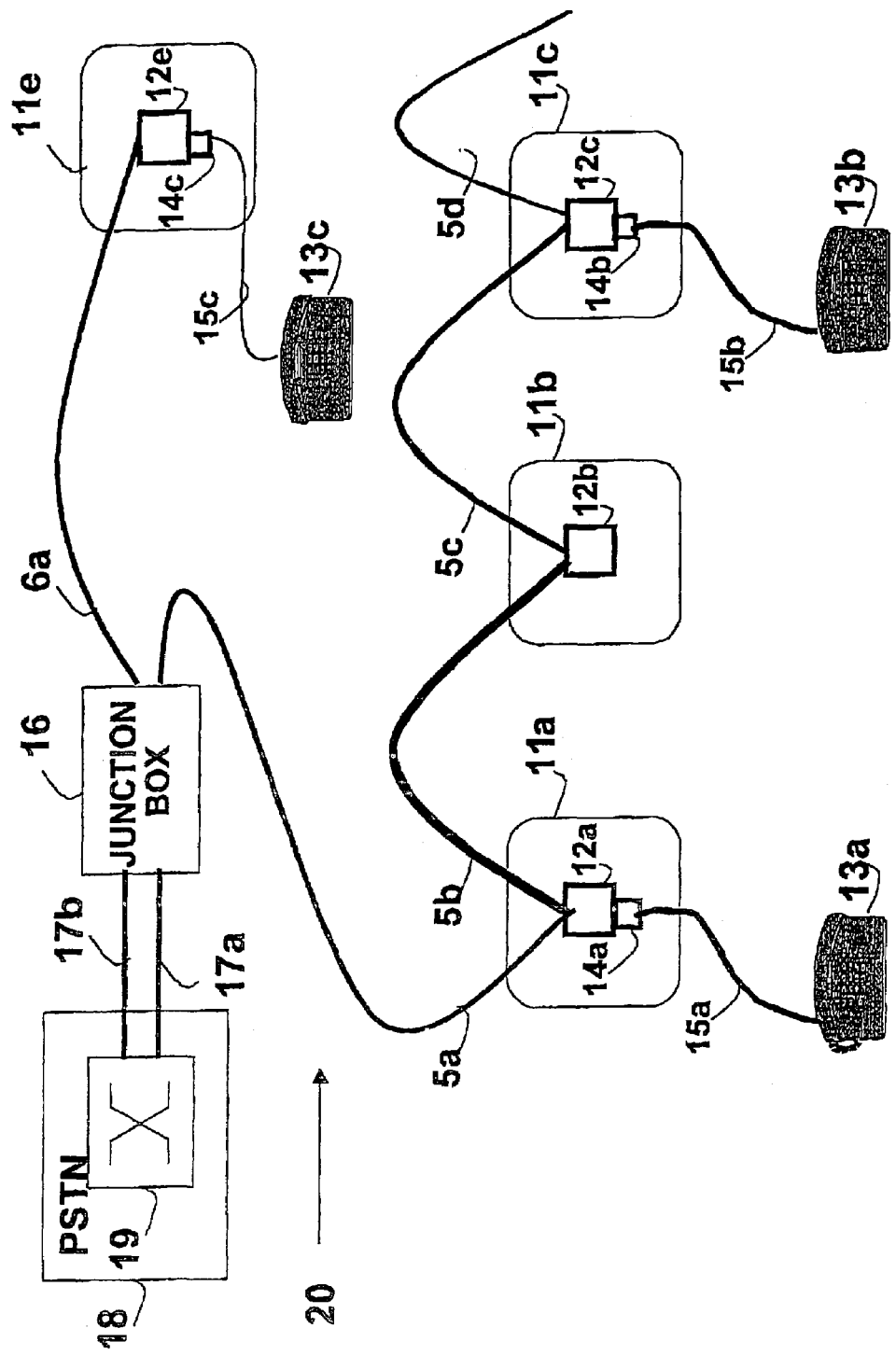
FIG. 2 shows a prior art two-line telephone wiring configuration for a residence or other building.
Figure 3:
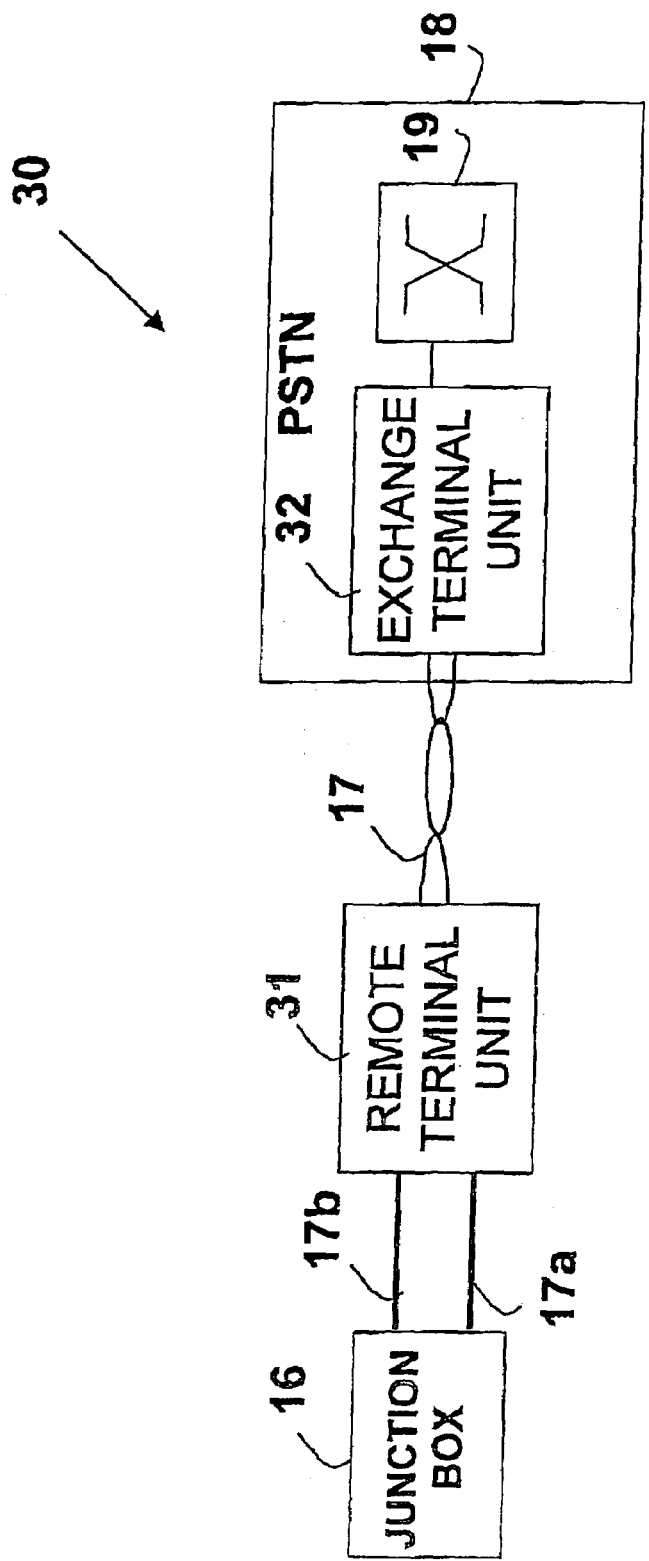
FIG. 3 shows a first prior-art telephone network for providing multiple lines to a residence or other building.
Figure 4:
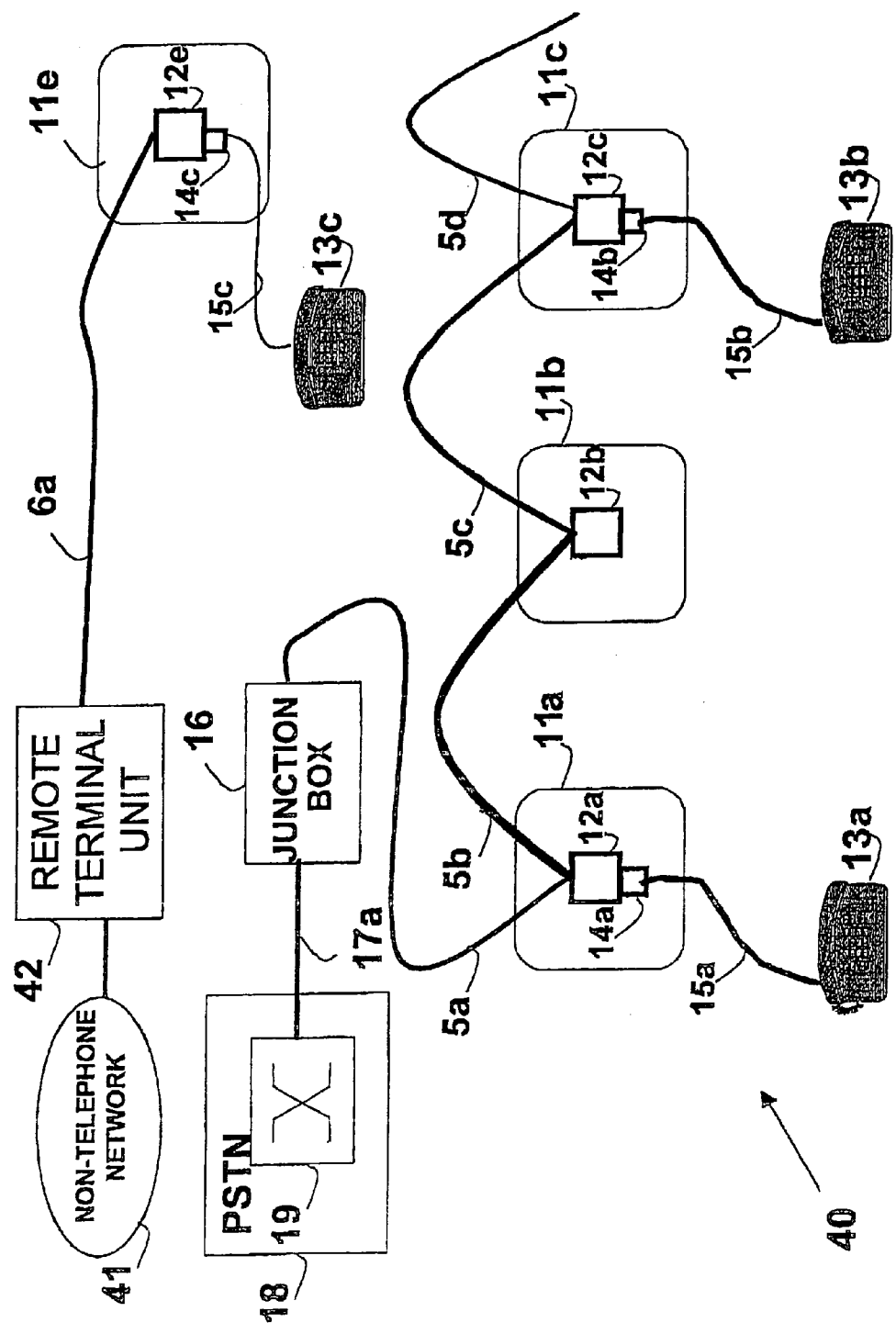
FIG. 4 shows a second prior-art telephone network for providing multiple lines to a residence or other building.

As shown in FIG. 8, a data communication network is formed such that the telephone line modem (as telephone line modem 23) within each outlet (such as outlets 88a, 88b, 88c, and 88d) allows networking between and among the outlets, using telephone line 5a, 5b, 5c, 5d, and 5e as the network media. Thus, telephones 13a and 13b can communicate between themselves (e.g. for use as an intercom) over the data communication network. In order to facilitate connection to external telephone networks, a module 85 must be added. Module 85 bridges the external telephone lines to the in-home data communication network over the telephone line. Network 80 interfaces to two external telephone lines via wire pairs 86a and 86b, which can be part of a PST network as shown in FIG. 2, or from other outside sources as previously described. External lines 86a and 86b are converted to digital streams by exchange line interfaces 81a and 81b respectively. The voice channels are coupled to a drop-and-insert multiplexer 82, which inserts into or extracts from the digital multiplexed data stream. The multiplexed data stream is coupled to a telephone line modem 83, which communicates via a cable 84 with the in-home data network.

While network 80 has been described having two external feeders 86a and 86b, it is clear that a single such feeder can also be used. For example, if only line 86a is used, exchange line interface 81b is unnecessary. Alternatively, more than two such external feeders can be used. For each additional feeder, an additional exchange line interface must be finished, along with additional support capability of the drop-and-insert multiplexer 82.

Implementing the network 80 within a residence requires replacing telephone outlets, such as outlet 11a (FIG. 1) by outlets according to the present invention, such as outlet 88a (FIG. 8), each containing a module, such as module 70 (FIG. 7). In this case, the line segments 5a, 5b, 5c, 5d and 5e each correspond to the single twisted pair shown in FIG. 7 connected to the telephone line modem, and the outlets 88a, 88b, 88c and 88d are connected to the line segments using a bus topology. In addition, a module such as module 85 must also be installed near the junction box 16. However, no new lines within the building need be installed or routed. After installing the network 80 within a residence, both the exchange features and the capability to interface two or more external telephone lines are available.

Figure 9:
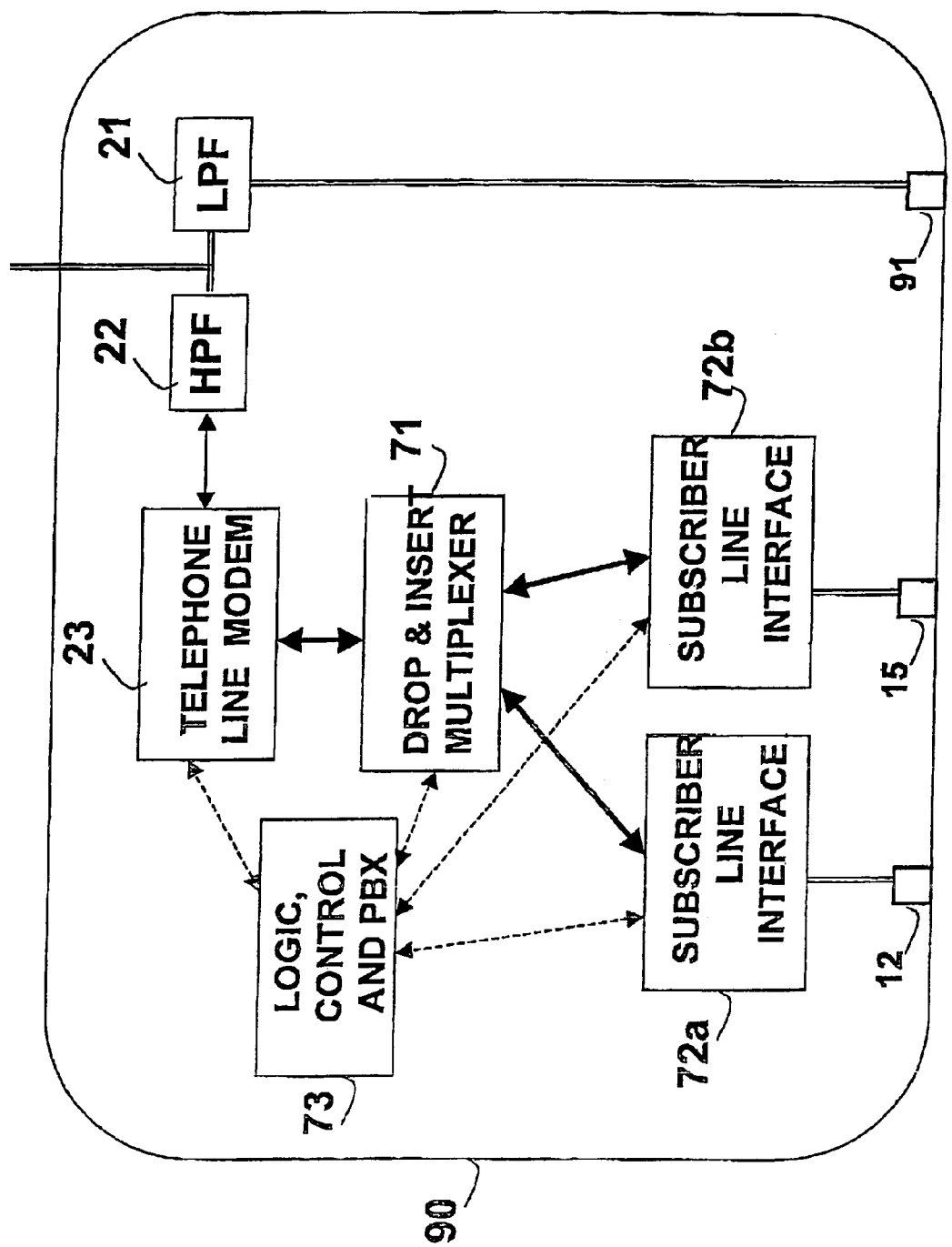
FIG. 9 shows a module according to the first embodiment of the present invention, which supports life-line capability.

Both module 70 and module 85 contain active components. Thus, in the event of a power loss or malfunction in any of the components, the network 80 may fail to provide telephony service. In order to support 'life-line' capability, therefore, the module requires additional components FIG. 9 illustrates a modified module 90 that provides life-line capability. A High-Pass Filter (HPF) 22 and a Low-Pass Filter (LPF) 21 split the telephone spectrum into a low band for carrying standard analog signals, and into a high band for the data communication network, as described by Dichter. LPF 21 uses only passive components, and is directly coupled to a connector 91. Hence, a telephone set plugged into the connector 91 can provide 'life-line' functionality, without any active components involved in the signal path. Module 90 may feature only the life-line connector 91, or may have the life-line connector 91 in addition to the connectors 12 and 15. Alternatively, in other embodiments of the present invention, modules may not employ 'life-line' connection 91 at all.

Figure 10:
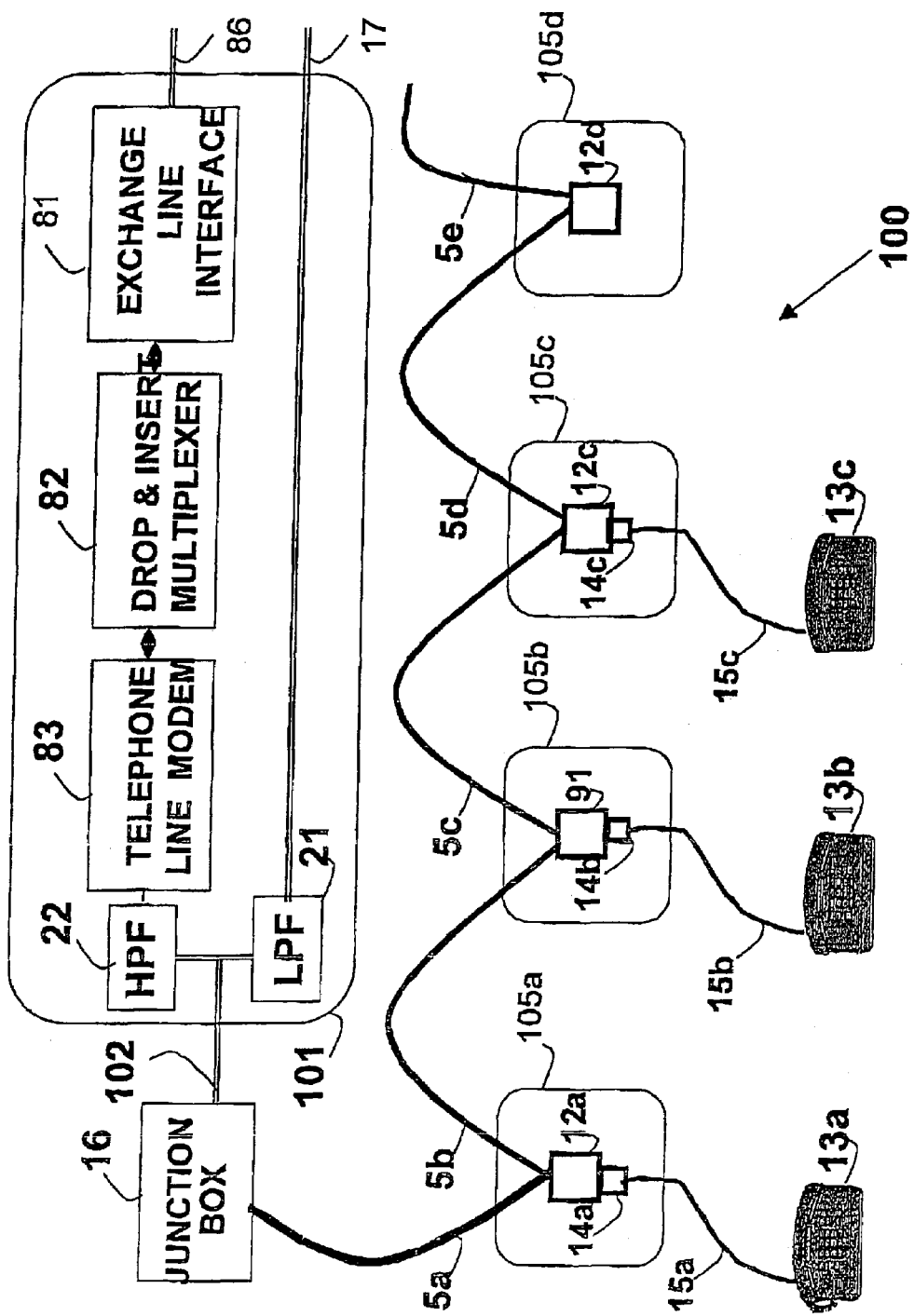
FIG. 10 shows a telephone network according to the first embodiment of present invention, which also support life-line capability.

FIG. 10 illustrates a network 100 according to the first embodiment of the invention, and features a modified network supporting life-line functionality. Network 100 includes modules 90a, 90b, 90c, and 90d, integrated within outlets 105a, 105b, 105c, and 105d respectively. Here, too, the line segments 5a, 5b, 5c, 5d and 5e each correspond to the single twisted pair shown in. FIG. 9 connected to the junction of the low pass filter 21 and the high pass filter 22, and the outlets 105a, 105b, 105c and 105d are connected to the line segments using a bus topology. Outlets 105a, 105c, and 105d have connectors 12a, 12c and 12d respectively, which support telephony interfaces based on voice signals carried by the data communication network. However, outlet 105b also has a connector 91, which provides the life-line connection as shown in FIG. 9. The low band of the spectrum carries POTS signals from telephone line 17, connected to the in-home network via LPF 21. Hence, telephone set 13b is directly connected to line 17, thereby offering life-line service. The high band of the spectrum is used for the data communication network and connects externally via HPF 22. Both LPF 21 and HPF 22 are connected by a cable 102 to junction box 16. All components serving the external line interface are included in module 101. In another embodiment of the present invention, each outlet (such as outlets 105a, 105b, 105c, and 105d) provides both life-line interface 91 in addition to at least one telephone interface 12, such that life-line access is available in all outlets within the residence.

While FIG. 10 illustrates the case where the module 90 is fully integrated within the outlet 105, embodiments of the present invention also include those where the module is external to the outlet. Likewise, selected components of a module may be integrated within the outlet while other components remain external. In all cases, of course, the appropriate electrical and mechanical connection between the module and the outlet are required.

An outlet according to the invention is physically similar in size, shape, and overall appearance to a standard outlet so that such an outlet can be substituted for a standard outlet in the building wall. No changes are required in the overall telephone line layout or configuration.

Figure 6:
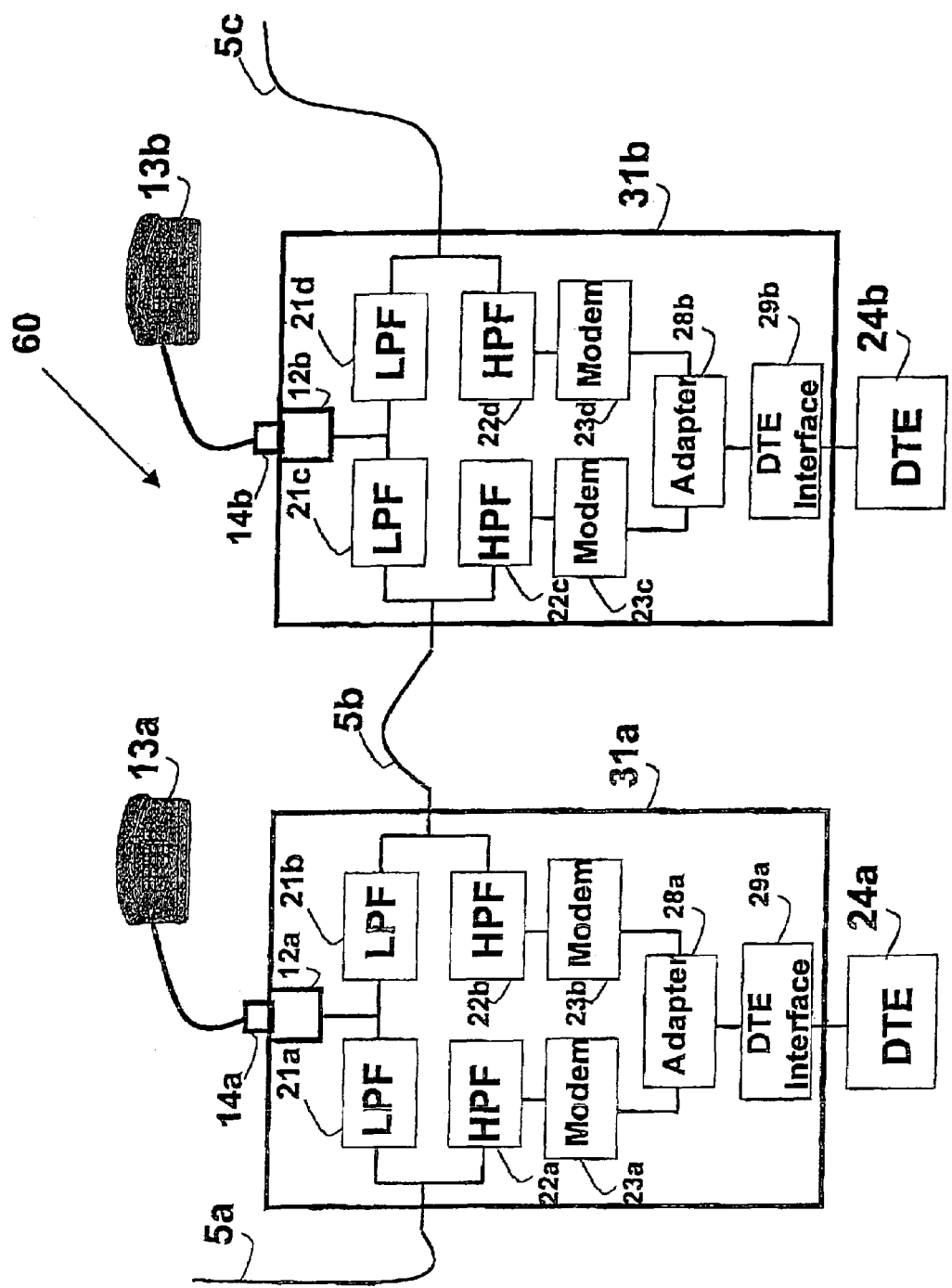
FIG. 6 shows part of a second prior-art local area network based on telephone line wiring for a residence or other building.
Figure 11:
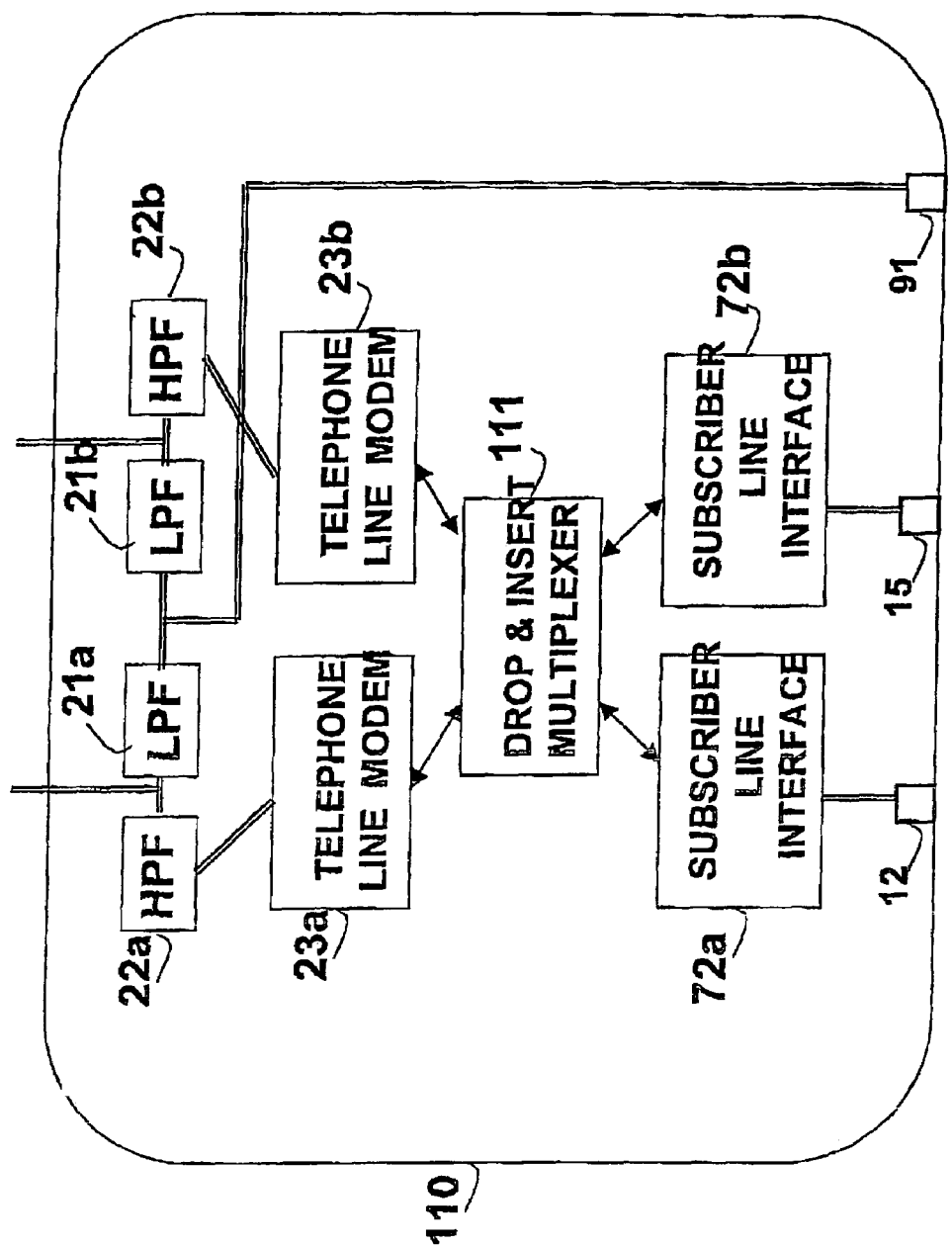
FIG. 11 shows a module according to a second embodiment of the present invention, which supports life-line capability.

While the invention has been so far described wherein the data communication network is based of the Dichter topology, the present invention can equally-well be applied to the prior-art wired network topology illustrated in FIG. 6, which is based on point-to-point data communication between any pair of connected outlets. FIG. 11 illustrates a module 110 supporting such a network, along with the life-line feature. The general configuration is similar to the module 90 described in FIG. 9. However, the connection to each telephone line segment of the point-to-point configuration has a high-pass filter (such as an HPF 22a and an HPF 22b), a low-pass filter (such as an LPF 21a and an LPF 21b), and a dedicated telephone line modem (such as modem 23a and modem 23b). A drop-and-insert multiplexer 111 inserts the voice channels into, and extracts the voice channels from, both data streams handled by telephone line modems 23a and 23b. However, voice channels not used by the module should be routed to other modules. In the case where three line segments are connected, an additional such set is required. The two LPF's 21a and 21b provide direct access to the lower band of the spectrum, and are jointly connected to life-line connector 91. If life-line support is not required, filters 21a, 21b, 22a, and 22b, as well as connector 91 can be omitted. Logic, control, PBX and other components such as power supply are not shown in FIG. 11. Additional capabilities may be provided by such components to manage such tasks as data handling and protocol conversions.

Figure 12:
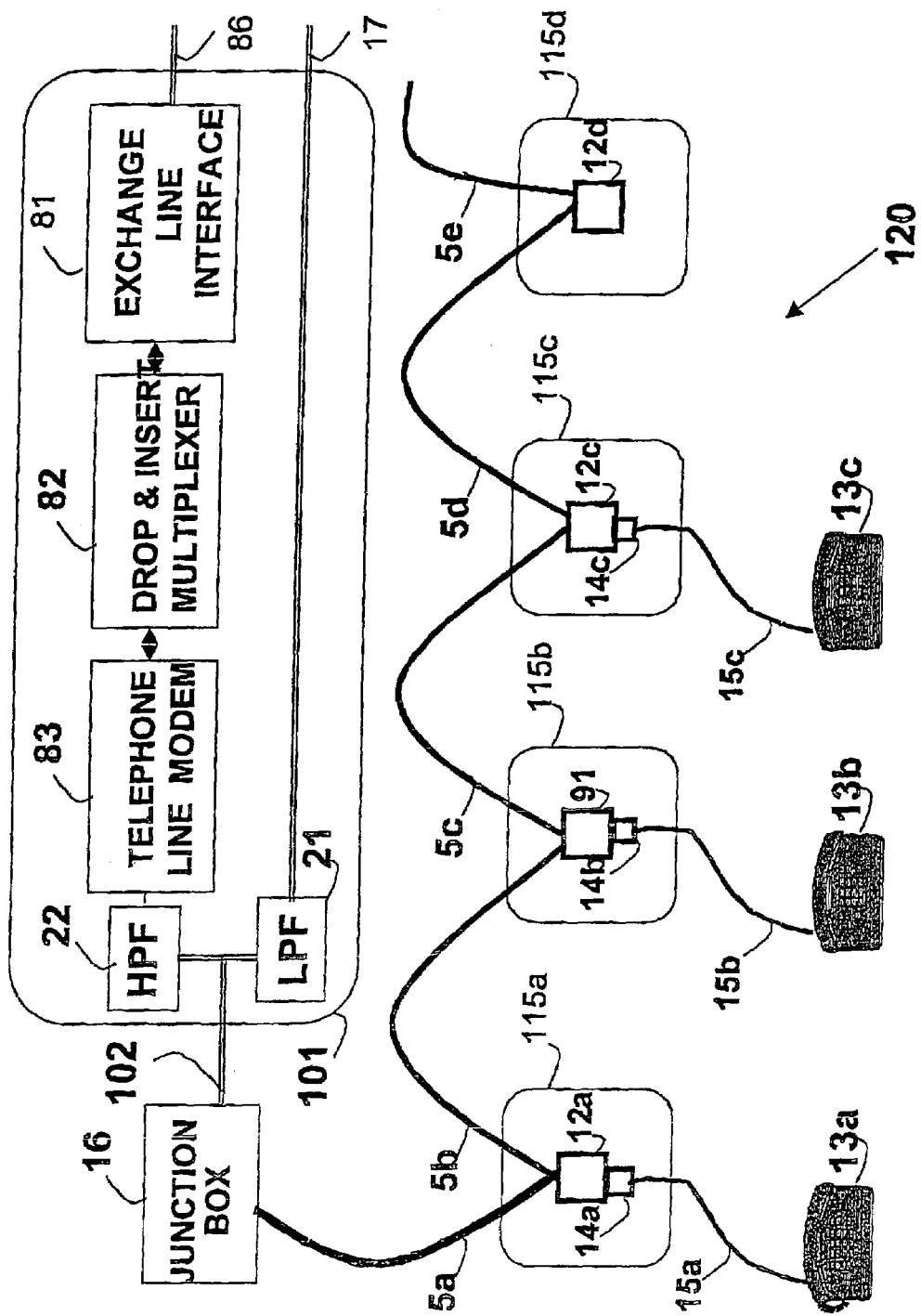
FIG. 12 shows a telephone network according to the second embodiment of present invention, which also supports life-line capability.

FIG. 12 illustrates a network 120 utilizing the modules 110. Each outlet, such as outlet 115a, 115b, 115c, and 115d, contains a module such as module 110 (FIG. 11). In this case, however, the line segment 5a corresponds to the twisted pair shown in FIG. 11 connected to the junction of the low pass filter 21a and the high pass filter 22a, whilst the line segment 5b corresponds to the twisted pair shown in FIG. 11 connected to the junction of the low pass filter 21b and the high pass filter 22b. In like manner, the line segments (5b, 5c), (5c, 5d), and (5d, 5e) each connected to the outlets 115b, 115c and 115d correspond to a respective twisted pair connected respectively to the junction of the low pass filter 21a and the high pass filter 22a and to the junction of the low pass filter 21b and the high pass filter 22b in FIG. 11. In general, the network structure of network 100 (FIG. 10) is retained. However, in this configuration, the outlets 115a, 115b, 115c and 115d are connected to the line segments using a point-to-point (or daisy chain) topology.

Upgrade Kit

Figure 13:
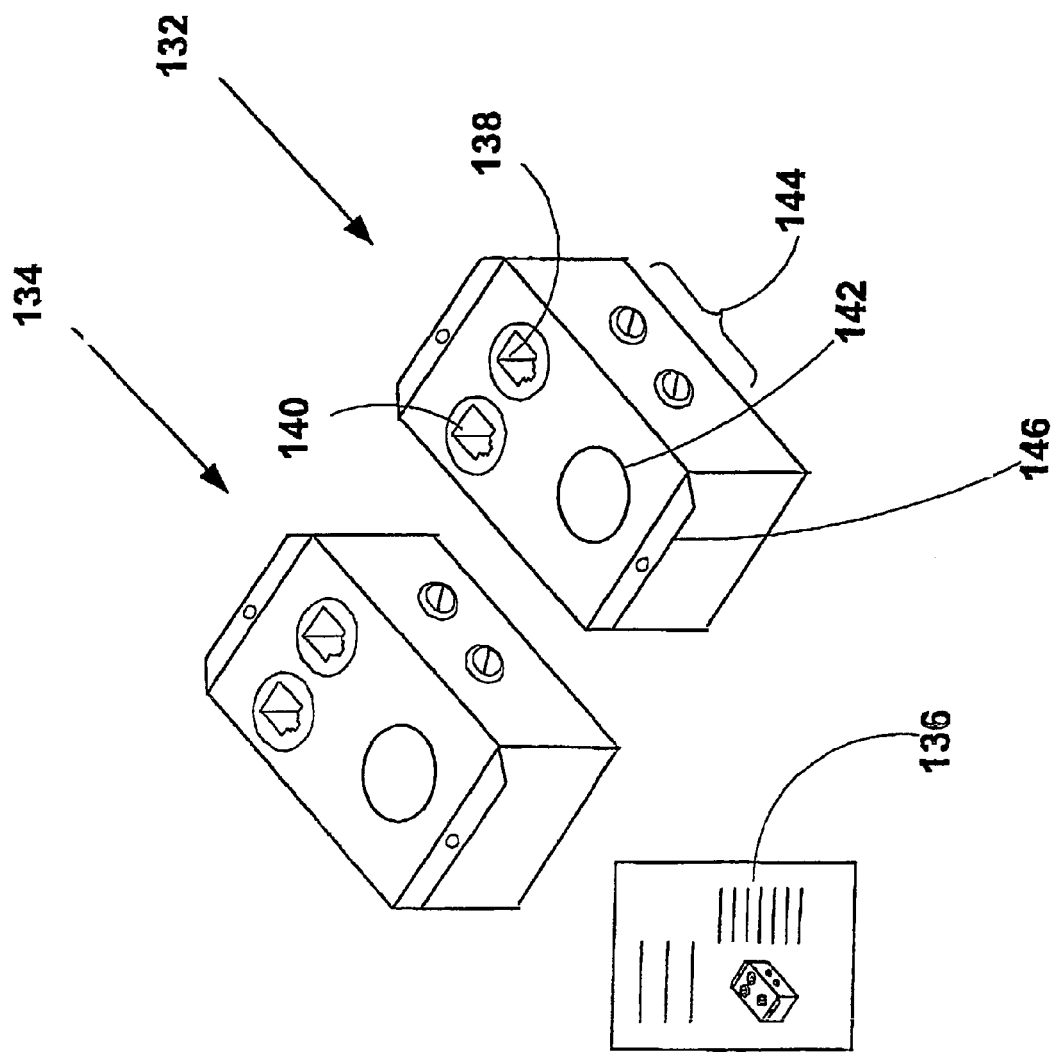
FIG. 13 shows a kit for upgrading an existing telephone installation to support a system according to the present invention.

The present invention also provides for a kit for upgrading all existing telephone installation to support a network as described herein. FIG. 13 illustrates an embodiment of such a kit containing an outlet 132 and an outlet 134 and installation instructions 136. Outlet 132 has a connection 144 for coupling to a telephone line and mounting points such as a flange 146 for installing in the building walls. Outlet 132 also has a jack 138 and a jack 140. The first supports life-line telephone service via connector 91 (FIG. 9) while the latter provides telephone service with improved exchange features. Within outlet 132 is a module according to the present invention, as previously described and illustrated in FIG. 9 or FIG. 11. Likewise, in an embodiment of the present invention, jack 138 is a telephone jack. In another embodiment, jack 140 is a data jack. The embodiment of the kit illustrated in FIG. 13 has two outlets, outlet 132 and outlet 134, which are illustrated as substantially identical. However, in another embodiment, the kit contains only outlet 132. Other variations are also possible in different embodiments. As with the modules described previously, additional components and capabilities may be provided to manage such tasks as data handling and protocol conversions.

The present invention also provides a method for upgrading a pre-existing telephone installation having a line within a building, to support a network as described herein. The method involves:

(i) providing a telephone line modem;
(ii) providing a subscriber-line interface;
(iii) providing a drop-and-insert multiplexer for interfacing between the voice channels and said subscriber-line interface;
(iv) providing an outlet; and
(v) equipping said outlet with said telephone-line modem, said subscriber-line interface, and said drop-and-insert multiplexer.

In another embodiment of the present invention, the existing installation can be upgraded to support life-line communication. In such a case, there are the additional steps of:

(vi) providing passive high-pass and low-pass filters for separating a lower band for standard analog telephone service from a higher band for multiplexed voice channels;
(vii) connecting the filters to isolate the standard analog telephone service from the multiplexed voice channels; and
(viii) providing a connector to connect a standard telephone set to the standard analog telephone service.

While the invention has been described with respect to a limited number of embodiments, it will be appreciated that many variations, modifications and other applications of the invention may be made.

Thus, for example, whilst the invention has been described with particular reference to a network installed in a domestic residence, it will be apparent that no such limitation is intended and the invention is equally well applicable for use in non-domestic premises such as office, factories and the like.

What is claimed is:

1. A network for coupling a plurality of analog telephone sets to a plurality of digitized telephone channels, said network comprising:
   a first wire pair at least in part outside of a building and comprising at least two conductors, said first wire pair being connected to concurrently carry a first analog service signal in a first analog service signal frequency band and a first serial digital data signal using frequency domain multiplexing, wherein the first digital data signal is carried bi-directionally in a first digital data signal frequency band distinct from the first analog service signal frequency band, the first digital data signal carrying first and second time-domain multiplexed digitized telephone channels;
   a second wire pair at least in part in a wall of the building and comprising at least two conductors, said second wire pair concurrently carrying a second analog service signal in a second analog service signal frequency band and a second serial digital data signal using frequency domain multiplexing, wherein the second digital data signal is carried bi-directionally in a second digital data frequency band distinct from the second analog service frequency band, the second digital data signal carrying the second digitized telephone channel;
   a first device coupled between said first and second wire pairs and constructed to pass the second digitized telephone channel between said first and second wire pairs, said first device being further connectable to a first analog telephone device for coupling the first digitized telephone channel, converted to analog telephony form, to the first analog telephone device; and
   a second device coupled to said second wire pair, said second device being further connectable to a second telephone device for coupling the second digitized telephone channel, converted to analog telephony form, to the second analog telephone device.

2. The network according to claim 1, wherein said first wire pair is a telephone local loop wire pair, the first digital data signal is ADSL based, and the first analog service signal is an analog telephone signal.

3. The network according to claim 1, wherein said first wire pair is cable television wiring, the first analog service signal is a cable television signal, and said first device is one of a set top box and a cable modem.

4. The network according to claim 1, wherein said second wire pair is a telephone wire pair and the second analog service signal is an analog telephone signal.

5. The network according to claim 1, wherein at least one of said first and second devices is attached to a wall of a building, or is at least in part housed within an outlet, or is mechanically and electrically attached to an outlet.

6. The network according to claim 1, wherein at least one of said first and second digitized telephone channels is pulse code modulated (PCM).

7. The network according to claim 1, wherein the first and second digitized telephone channels are provided by respective, distinct first and second telephone service providers.

8. The network according to claim 1, wherein said first device is further connectable to an analog service unit for coupling the first analog service signal to the analog service unit.

9. The network according to claim 1, wherein said second device is further connectable to an analog service unit for coupling the second analog service signal to the analog service unit.

10. The network according to claim 1, wherein said first device is constructed to couple the first and second analog service signals.

11. The network according to claim 1, wherein said first device is constructed to convert the first analog service signal to the second analog service signal.

12. A device for coupling a digitized telephone channel to an analog telephone set, for use with first and second wire pairs,
   wherein the first wire pair is at least in part outside of a building and comprises at least two conductors, and the first wire pair concurrently carries a first analog service signal in a first analog service signal frequency band and a first serial digital data signal using frequency domain multiplexing,
   wherein the first digital data signal is carried bi-directionally in a first digital data signal frequency band distinct from the first analog service signal frequency band, and the first digital data signal carries first and second time-domain multiplexed digitized telephone channels,
   wherein the second wire pair is at least in part in a wall in the building and comprises at least two conductors, and the second wire pair concurrently carries a second analog service signal in a second analog service signal frequency band and a second serial digital data signal using frequency domain multiplexing, and
   wherein the second digital data signal is carried bi-directionally in a second digital data signal frequency band distinct from the second analog service signal frequency band, and the second digital data signal carries the second digitized telephone channel, said device comprising:
   a first connector connectable to the first wire pair;
   a first data filter coupled to said first connector for passing only the first digital data signal;
   a first modem coupled to said first data filter and constructed to conduct serial digital data bi-directionally over the first wire pair;
   a second connector connectable to said second wire pair;
   a second data filter coupled to said second connector for passing only the second digital data signal;
   a second modem coupled to said second data filter and constructed to conduct serial digital data bi-directionally over the second wire pair;
   a telephone connector connectable to an analog telephone set;
   a subscriber line interface coupled to said telephone connector and constructed to conduct a telephone signal to and from the analog telephone set;
   a multiplexer having a first port coupled to said first modem, a second port coupled to said second modem and a third port coupled to said subscriber line interface, said multiplexer being constructed to pass the first digitized telephone channel between said first and third ports, and to pass the second digitized telephone channel between said first and second ports; and a single enclosure housing said connectors, said data filters, said modems, said interface and said multiplexer.

13. The device according to claim 12, wherein the first wire pair is a telephone local loop wire pair, the first digital data signal is ADSL based, the first analog service signal is an analog telephone signal, said first data filter is a high pass filter, and said first modem is a DSL modem.

14. The device according to claim 12, wherein the first wire pair is cable television wiring, the first analog service signal is a cable television signal, said first modem is a television cable modem and said first device is part of one of a set top box and a cable modem.

15. The device according to claim 12, wherein the second wire pair is a telephone wire pair, the second analog service signal is an analog telephone signal, said second data filter is a high pass filter and said second modem is a telephone wiring modem.

16. The device according to claim 12, wherein said device is attachable to a wall of a building, or is at least in part housed within an outlet, or is mechanically and electrically attached to an outlet.

17. The device according to claim 12, wherein at least one of the first and second digitized telephone channels uses pulse code modulation and said multiplexer is a PCM multiplexer.

18. The device according to claim 12, wherein said device is further constructed for coupling the analog service signals to an analog service unit, said device further comprising:

an analog service connector connectable to an analog service unit, a service filter coupled between said analog service connector and one of said first and second connectors for passing only the respective one of the first and second analog service signals.

19. The device according to claim 12, wherein said first device is constructed to couple the first and second analog service signals.

20. The network according to claim 12, wherein said device is constructed to convert the first analog service signal to the second analog service signal.

\* \* \* \* \*